United States Patent
Flanders et al.

(10) Patent No.: US 7,003,211 B2
(45) Date of Patent: Feb. 21, 2006

(54) OPTICAL SYSTEM PRODUCTION SYSTEM

(75) Inventors: Dale C. Flanders, Lexington, MA (US); Peter S. Whitney, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 107 days.

(21) Appl. No.: 10/824,855

(22) Filed: Apr. 15, 2004

(65) Prior Publication Data

US 2004/0223721 A1 Nov. 11, 2004

Related U.S. Application Data

(62) Division of application No. 09/645,827, filed on Aug. 25, 2000.

(60) Provisional application No. 60/186,925, filed on Mar. 3, 2000, provisional application No. 60/165,431, filed on Nov. 15, 1999.

(51) Int. Cl.
*G02B 6/00* (2006.01)
(52) U.S. Cl. .................. 385/147; 385/14; 385/88; 385/90; 29/834; 29/840
(58) Field of Classification Search .............. None
See application file for complete search history.

(56) References Cited

U.S. PATENT DOCUMENTS

| | | | |
|---|---|---|---|
| 4,528,747 A | 7/1985 | Hoffman et al. | |
| 4,702,556 A | 10/1987 | Ishii et al. | |
| 4,773,727 A | 9/1988 | LePivert et al. | |
| 4,778,241 A | 10/1988 | Haltenorth | |
| 5,351,330 A | 9/1994 | Jongewaard | |
| 5,570,444 A | 10/1996 | Janssen et al. | |
| 5,600,749 A | 2/1997 | Lee et al. | |
| 5,745,624 A | 4/1998 | Chan et al. | |
| 5,870,518 A | 2/1999 | Haake et al. | |
| 6,053,640 A | 4/2000 | Miyokawa et al. | |
| 6,074,103 A | 6/2000 | Hargreaves et al. | |
| 6,185,816 B1 * | 2/2001 | Freund et al. | 29/833 |
| 6,207,950 B1 * | 3/2001 | Verdiell | 250/239 |
| 6,227,724 B1 * | 5/2001 | Verdiell | 385/91 |
| 6,376,268 B1 * | 4/2002 | Verdiell | 438/26 |
| 6,586,726 B1 * | 7/2003 | Verdiell | 250/239 |

FOREIGN PATENT DOCUMENTS

EP 0 647 091 4/1995

(Continued)

OTHER PUBLICATIONS

Knight, J. Douglas et al, "A Two-Axis Micropositioner for Optical Fiber Alignment," Hewlett-Packard Journal, 44 (1993) Dec., No. 6, Palo Alto, CA.

(Continued)

*Primary Examiner*—John D. Lee
*Assistant Examiner*—Kevin S. Wood
(74) *Attorney, Agent, or Firm*—Houston Eliseeva LLP

(57) ABSTRACT

Mounting and alignment structures for optical components allow optical components to be connected to an optical bench and then subsequently aligned, i.e., either passively or actively, in a manufacturing or subsequent calibration or recalibration, alignment or realignment processes. The structures comprise quasi-extrusion portions. This portion is "quasi-extrusion" in the sense that it has a substantially constant cross section in a z-axis direction as would be yielded in an extrusion manufacturing process. The structures further comprise at least one base, having a laterally-extending base surface, and an optical component interface. At least one armature connects the optical component interface with the base. In the preferred embodiment, the base surface is securable to an optical bench.

11 Claims, 22 Drawing Sheets

FOREIGN PATENT DOCUMENTS

| EP | 1 093 162 A1 | 4/2001 |
|---|---|---|
| EP | 1115016 A1 | 11/2001 |
| FR | 2 690 996 | 11/1993 |
| GB | 2 229 856 | 10/1990 |
| GB | 2 296 100 | 6/1996 |
| WO | WO 91/06022 | 5/1991 |
| WO | WO 98/58287 | 12/1998 |

OTHER PUBLICATIONS

Kravitz, S.H, et al., "A Passive Micromachined Device for Alignment of Arrays of Single-mode Fibers for Manufacturable Photonic Packaging," Proceedings of the Lasers and Electro-Optics Society Annual Meeting (Leos), US, New York, vol. Meeting 7, Oct. 31, 1994, pp 226-227.

Andreasch, Wolfgang et al., Flexible Automated Assembly of Micro-Optical Elements (Optical SMD), Proc. SPIE, vol. 2906, pp 162-170, Microborobotics: Components and Applications, Armin Sulzmann: Ed, published Dec. 1996.

Enochs, Scott, "A Packaging Technique to Achieve Stable Single-Mode Fiber to Laser Alignment," Proc. SPIE, vol. 703, pp 42-47, Integration and Packaging of Optoelectronic Devices (1986).

Madou, Mark, Fundamentals of Microfabrication, Boca Raton, N.Y. pp 312-313.

Mohr, J., Free Space Optical Components and Systems Based on LIGA Technology, 2000 IEEEILEOA International Conference on Optical MEMS, Kauai, Hawaii, Aug. 21-24, 2000 IEEE catalog #00EX30000.

Oh, Ksawn et al., "Flip-Chip Packaging Using Micromachined Conductive Polyhmer Bumps and Alignment Pedestals for MOEMS," IEEE journal of Selected Topics in Quantum Electronics, vol. 5, No. 1, Jan./Feb. 1999, pp. 119-125.

Rogner, A. et al., "LIGA-based Flexible Microstructures for Fiber-Chip Coupling," J. Mcromech. Microeng. 1 (1991) pp 167-170.

Scussat, M. et al., "An innovative Flexible and Accurate Packaging Technique Suited to Fabricate Low Cost Micro Optoelectronic Modules," Electronic Components and Technology Conference, IR-IOA, DMT, EPFL, 1015 Lausanne, Switzerland (2000).

Scussat, Marco et al., "Automated Surface Mounting of Miniature Optical Elements," DMT, EPFL, 1015 Lausanne, Switzerland (1998).

Sharpe; William N. et al., Mechanical Properties of LIGA-Depostied Nickel for MEMS Transducers, 1997 International Conference on Solid-State Sensor and Actuators, Chicago, Jun. 16-19, 1997.

Wursch, Alain et al., "An Innovative Micro Optical Elements Assembly Robot Characterized by High Accuracy and Flexibility," Electronic Components Conference 2000, DMT, EPFL, 1015 Lausanne, Switzerland (2000).

Ziegler, P. et al., "Passive Alignment and Hybird Integration of Active and Passive Optical Components on a Microoptical LIGA-Bench," Micro Opto Electro Mechanical Systems—MOEMS '99, pp 186-189.

* cited by examiner

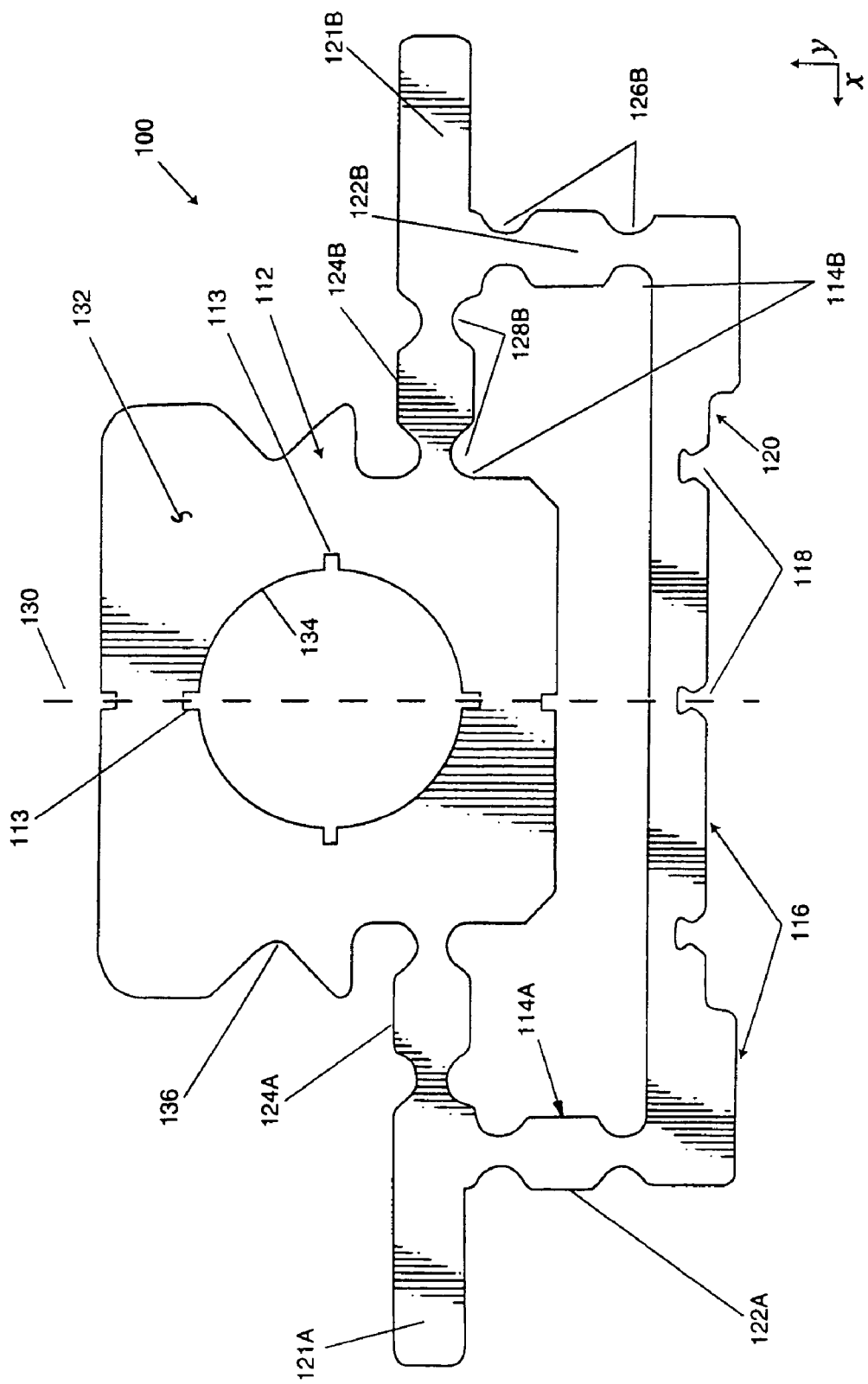

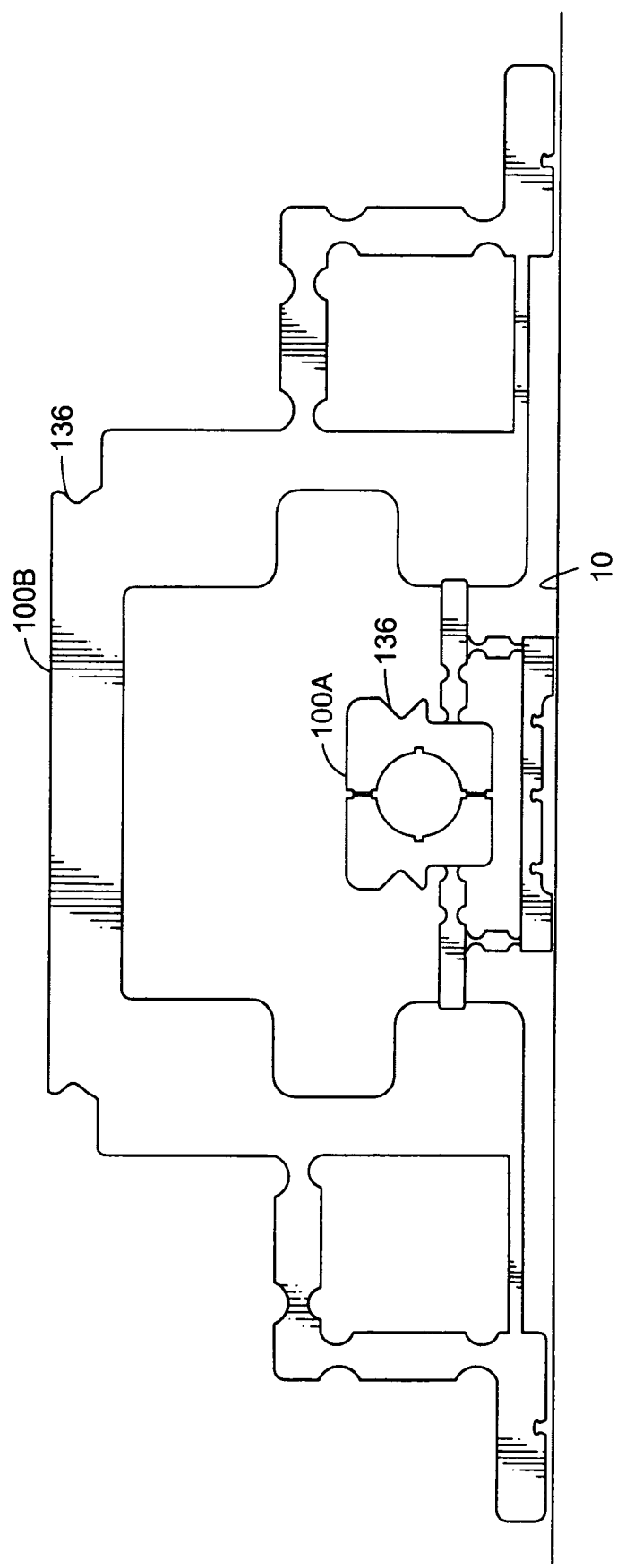

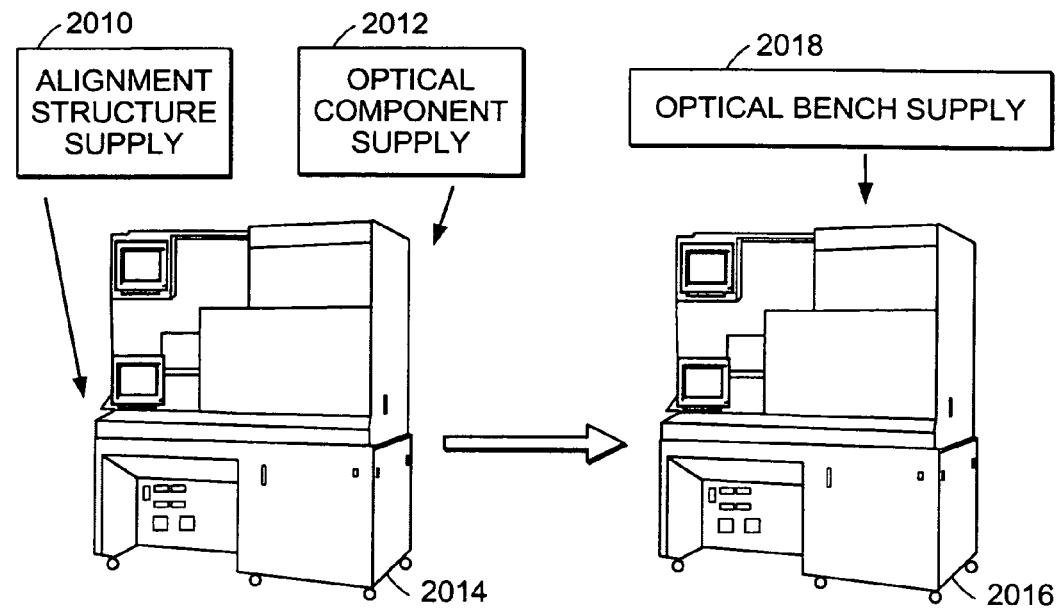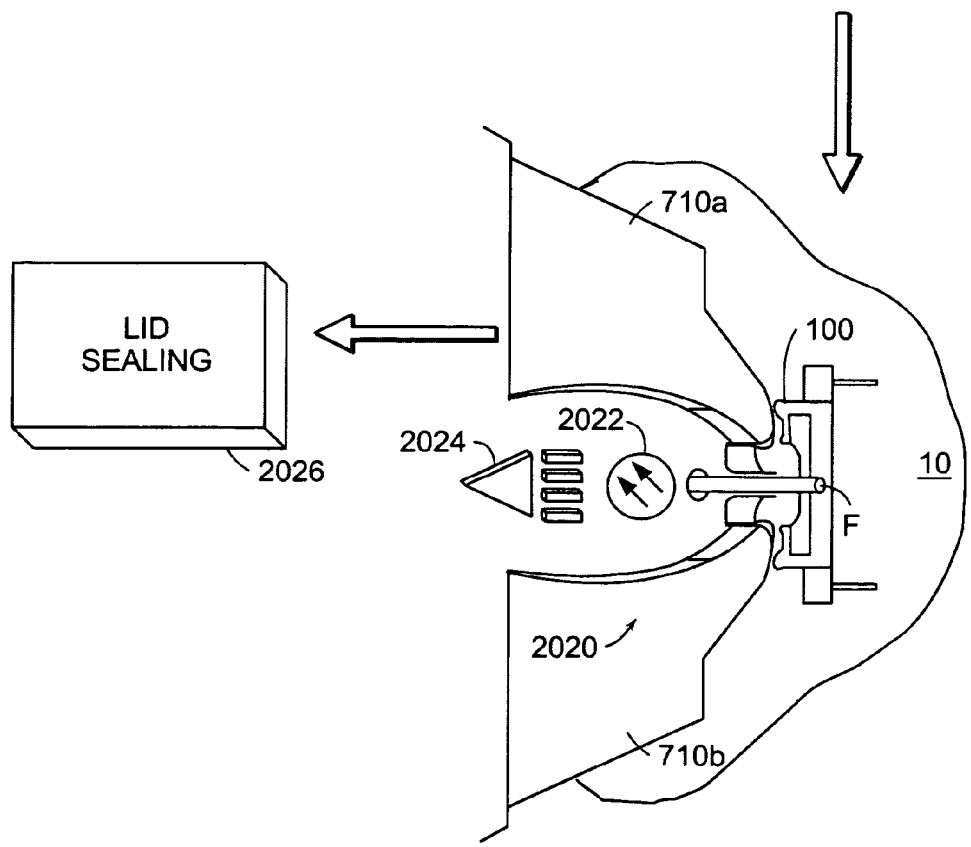
FIG. 26

OPTICAL SYSTEM PRODUCTION SYSTEM

RELATED APPLICATIONS

This application is a divisional application of U.S. application Ser. No. 09/645,827, filed on Aug. 25, 2000 (incorporated herein by this references), which application claims the benefit of the filing date of U.S. Provisional Application Ser. No. 60/165,431, filed Nov. 15, 1999, which is incorporated herein by this reference in its entirety. This application also claims the benefit of the filing date of U.S. Provisional Application No. 60/186,925, filed Mar. 3, 2000, which is incorporated herein by this reference in its entirety.

BACKGROUND OF THE INVENTION

Component alignment is of critical importance in semiconductor and/or MEMS (micro electromechanical systems) based optical system manufacturing. The basic nature of light requires that light generating, transmitting, and modifying components must be positioned accurately with respect to one another, especially in the context of free-space-optical systems, in order to function properly and effectively in electro-optical or all optical systems. Scales characteristic of semiconductor and MEMS necessitate sub-micron alignment accuracy.

Consider the specific example of coupling a semiconductor diode laser, such as a pump laser, to a fiber core of a single mode fiber. Only the power that is coupled into the fiber core is usable to optically pump a subsequent gain fiber, such as a rare-earth doped fiber or regular fiber, in a Raman pumping scheme. The coupling efficiency is highly dependent on accurate alignment between the laser output facet and the core; inaccurate alignment can result in partial or complete loss of signal transmission through the optical system.

Moreover, such optical systems require mechanically robust mounting and alignment configurations. During manufacturing, the systems are exposed to wide temperature ranges and purchaser specifications can explicitly require temperature cycle testing. After delivery, the systems can be further exposed to long-term temperature cycling and mechanical shock.

Solder joining and laser welding are two common mounting techniques. Solder attachment of optical elements can be accomplished by performing alignment with a molten solder joint between the element to be aligned and the platform or substrate to which it is being attached. The solder is then solidified to "lock-in" the alignment. In some cases, an intentional offset is added to the alignment position prior to solder solidification to compensate for subsequent alignment shifts due to solidification shrinkage of the solder. In the case of laser welding, the fiber, for example, is held in a clip that is then aligned to the semiconductor laser and welded in place. The fiber may then also be further welded to the clip to yield alignment along other axes. Secondary welds are often employed to compensate for alignment shifts due to the weld itself, but as with solder systems, absolute compensation is not possible.

Further, there are two general classes of alignment strategies: active and passive. Typically in passive alignment of the optical components, registration or alignment features are fabricated directly on the components or component carriers as well as on the platform to which the components are to be mounted. The components are then mounted and bonded directly to the platform using the alignment features. In active alignment, an optical signal is transmitted through the components and detected. The alignment is performed based on the transmission characteristics to enable the highest possible performance level for the system.

SUMMARY OF THE INVENTION

The problem with conventional optical system production processes is that they require very specialized machines to implement and typically produce marginal quality components quickly or high quality components slowly.

The reason for the discrepancy between speed and quality is the types of alignments that are performed. Passive alignment can be performed quickly, but the resulting alignment is typically sub optimal. Active alignment is accurate, but slow.

The present invention is directed an optical system production system. It utilizes passive placement of the optical components on an optical bench followed by a preferably fast active alignment process. In this way, it seeks to capture the best features offer by conventional alignment systems.

In general, according to one aspect, the invention features an optical system production line. The line comprises an optical bench supply that provides optical benches and a component supply that provides optical components. A pick-and-place machine receives optical benches and picks optical components from the optical component supply, and then places the optical components on the optical benches. It then secures the optical components to the bench. Optical system aligner then characterizes the positions of the optical components on the optical bench and mechanically adjusts the relative positions of the optical components.

In the preferred embodiment, the pick-and-place machine secures the optical components to the bench by solder bonding. In the current implementation, the pick and place machine is a flip-chip bonder. Further, the optical system aligner characterizes the positions of the optical components by activating an optical link of the optical system, detecting an optical signal after interaction with at least some of the optical components, and adjusting the optical components to optimize transmission of the optical signal over the link. The alignment system preferably comprises two jaws for engaging a mounting structure supporting the optical component and moving the structure relative to the bench.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2 is a front plan view of the first embodiment mounting and alignment structure;

FIGS. 15A and 15B are front plan views showing the fourteenth embodiment of the mounting and alignment structure and it deployment for mounting a second optical component in proximity to another optical component;

FIG. 26 is a schematic diagram illustrating a production line for optical systems, according to the present invention.

DETAILED DESCRIPTION OF THE PREFERRED EMBODIMENTS

Mounting and Alignment Structure Configuration

Figure 1:
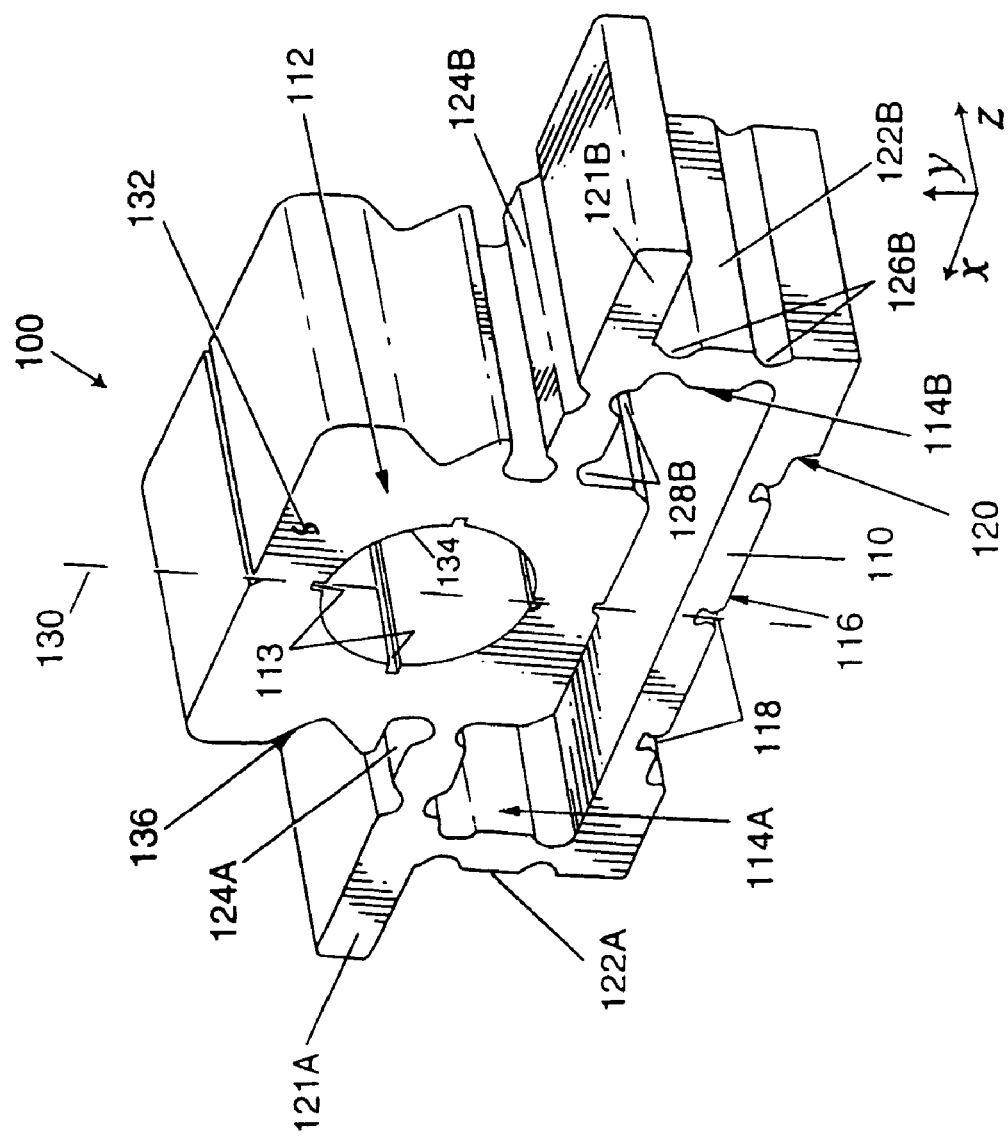
FIG. 1 is a perspective view of a first embodiment of a mounting and alignment structure according to the present invention.

FIG. 1 shows an exemplary mounting and alignment structure, which has been constructed according to the principles of the present invention.

Generally, the alignment structure 100 comprises a base 110, an optical component interface 112, and left and right armatures 114A, 1141B, which either directly connect, or indirectly connect, the base 110 to the interface 112.

The base 110 comprises a laterally-extending base surface 116. In the illustrated example, the base surface 116 extends in a plane of the x and z axes, generally.

The base/base-surface comprise alignment features. In some embodiment, these features are adapted to mate with preferably opposite-gendered alignment features of an optical bench. In the specific illustrated implementation, the alignment features are used by machine vision to match to alignment marks or features of a bench. Specifically, the alignment features comprise a wide, U-shaped cut out region 120. Three female alignment channels 118 are further provided that extend along the entire depth of the structure in the direction of the z-axis. The U-shaped cut-out region 120 has the added advantage of minimizing the contact area and thus stress in the interface between the structure and the bench or other surface to which it is attached.

In the illustrated implementation, each of the armatures 114A, 114B comprises two segments 122 and 124. Specifically, and for example, armature 114B comprises two segments, 122B and 124B.

The vertically-extending segments 122A, 122B, i.e., extending at least partially in the y-axis direction, have two flexures 126A, 126B along their length, in the illustrated embodiment. These flexures are regions of reduced cross-sectional area in the segments, which regions extend in the direction of the z-axis. The vertically-extending segments 122 facilitate the positioning of an optical component, installed on the interface 112, along the x-axis; the flexures 126A, 126B facilitate the pivoting of the segments 122A, 122B in a plane of the x and y axes. A purpose of the flexures is to isolate regions of microstructural change, such as occurring in plastic deformation, in order to make the yield forces, for example, readily predictable. Also, the flexures localize deformation on the armatures and consequently decrease the amount of force/movement required in the optical component before plastic deformation is initiated in the armature.

Horizontally-extending (i.e., extending in the direction of the x-axis) segments 124A, 124B each comprise, in the illustrated embodiment, two flexures 128A, 128B. These flexures are also regions of reduced cross-sectional area in the respective segments, the flexures extending in the direction of the z-axis.

The horizontally-extending segments 124A, 124B allow the positioning of an optical component, installed on the optical component interface 112, generally vertically along the y-axis. Armature deformation is facilitated by respective flexures 128A, 128B.

In one implementation, the optical component is bonded to the optical component interface 112, and specifically bonding surface 132. This bonding is accomplished either through polymeric adhesive bonding or preferably solder bonding. In other implementations, thermocompression bonding, laser welding, reactive bonding or other bonding method are used.

In the illustrated embodiment, the component interface further includes structure-component alignment features 113. In the illustrated embodiment, the structure-component alignment features comprise slots extending in the z-axis direction from the component bonding surface 132. As a result, corresponding male-projections of an optical component engage the slots 113 to locate and align the optical component over the optical port 134 both along the x-axis and y-axis.

The optical component interface, in some implementations, comprises a port 134 for enabling an optical signal to pass transversely through the structure. This enables optical access to the optical component by either facilitating the propagation of an optical signal to and/or away from the component.

To facilitate the grasping and placement of the structure 100, a handle 136 is also preferably provided on the structure. In the illustrated embodiment, the handle 136 comprises two V- or U-shaped cut out regions on either side, near the top of the top of the structure. In the illustrated example, they are integral with the optical component interface 112.

The handle 136 enables the manipulation of the structure 100 when attached to the bench 10. Specifically, the right cut-out is engaged to displace the structure to the left, for example. To displace the structure vertically or in the y-axis direction, both cut-outs are engaged enabling the structure to be pressed down toward the bench 10 or pulled away from the bench.

To further facilitate grasping and installation on the bench, wing portions 121A, 121B are provided on each armature. These are used by a heated vacuum chuck to enable manipulation of the structure and subsequent heating for solder bonding. The short distance between the wings 121 and the base surface 116 facilitate good heat transfer.

FIG. 2 is a front plan view of the first embodiment of the mounting and alignment structure 100, illustrated in FIG. 1. This view illustrates the construction of the left and right armatures 114A, 114B, and specifically how the armatures are constructed from respective horizontally-extending segments 124 and vertically extending segments 122.

Also shown is the extent of the bonding surface 132. Typically, a solder material is first applied to the surface 132. Later, the optical components and/or structures are heated and brought into contact with each other to effect the solder bonding. In other embodiments, epoxy bonding processes are used in which epoxy is first applied to the surface 132.

Figure 3A:
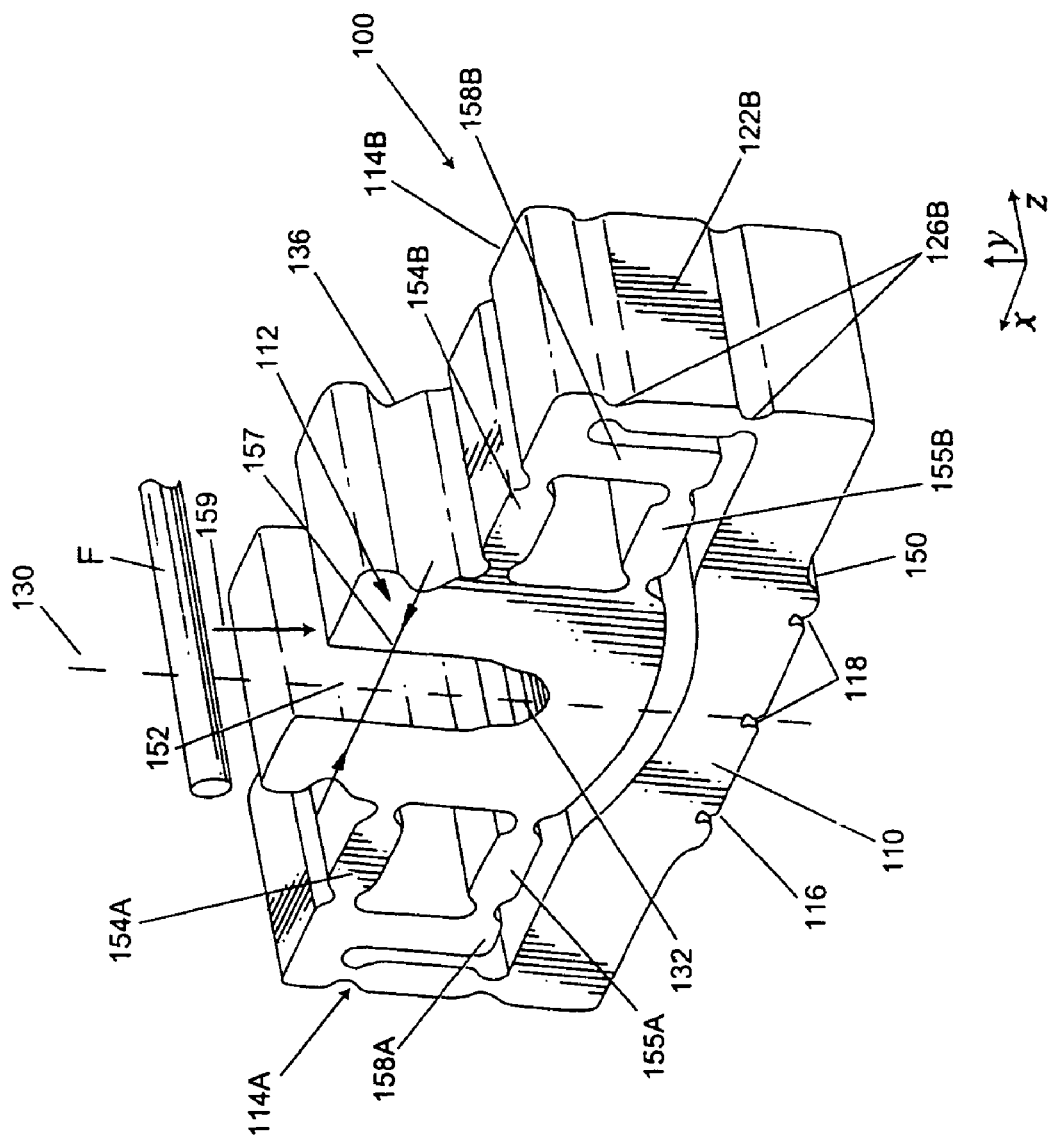
FIG. 3A is a perspective view showing a second embodiment of the mounting and alignment structure according to the present invention.

FIG. 3A shows a second embodiment of the mounting and alignment structure. This embodiment shares a number of similarities with the first embodiment illustrated in FIGS. 1 and 2. Specifically, the mounting surface 116 has slot-like alignment channels 118 for visual alignment.

Turning to the armatures 114A, 114B, vertically-extending portions 122A, 122B are provided similar to the first embodiment. Two horizontally extending portions 154, 155, however, are provided on each armature on each side of the mounting and alignment structure 100. Specifically, the armature 114B comprises two horizontally extending segments 154B, 155B, which extend generally from the vertically extending portion 122B to the optical component interface 112. Specifically, a linkage portion 158B connects the distal ends both of the horizontally-extending portions 154B, 155B to the vertically-extending portion 122B of armature 114B.

The second embodiment of FIG. 3A illustrates a further configuration for the optical component interface 112. Specifically, the optical interface 112 of the second embodiment comprises a V or U-shaped cut-out region or slot 152 extending through the mounting and alignment structure 100 in the direction of the z-axis. This open-slot configuration allows a fiber, schematically illustrated as F to be installed vertically in the direction of arrow 159 down into the slot 152. In the typical implementation, the fiber F is then bonded to the surface 132 in the bottom of the slot. Solder bonding is preferably used, but other alternatives such as epoxy bonding exist.

In the preferred embodiment, the depth of the slot relative to the locations of the attachment points of the armatures is designed to resist any rocking in response to z-axis forces exerted on the structure by the fiber. Specifically, some movement in response to z-axis forces is unavoidable. Slot depth is controlled, however, so that the fiber axis does not move in response to these forces.

In alternative embodiments, the handles 136 are engaged and the U-shaped slot crimped closed by applying force along arrow 157 to secure the optical component, such as fiber.

Figure 3B:
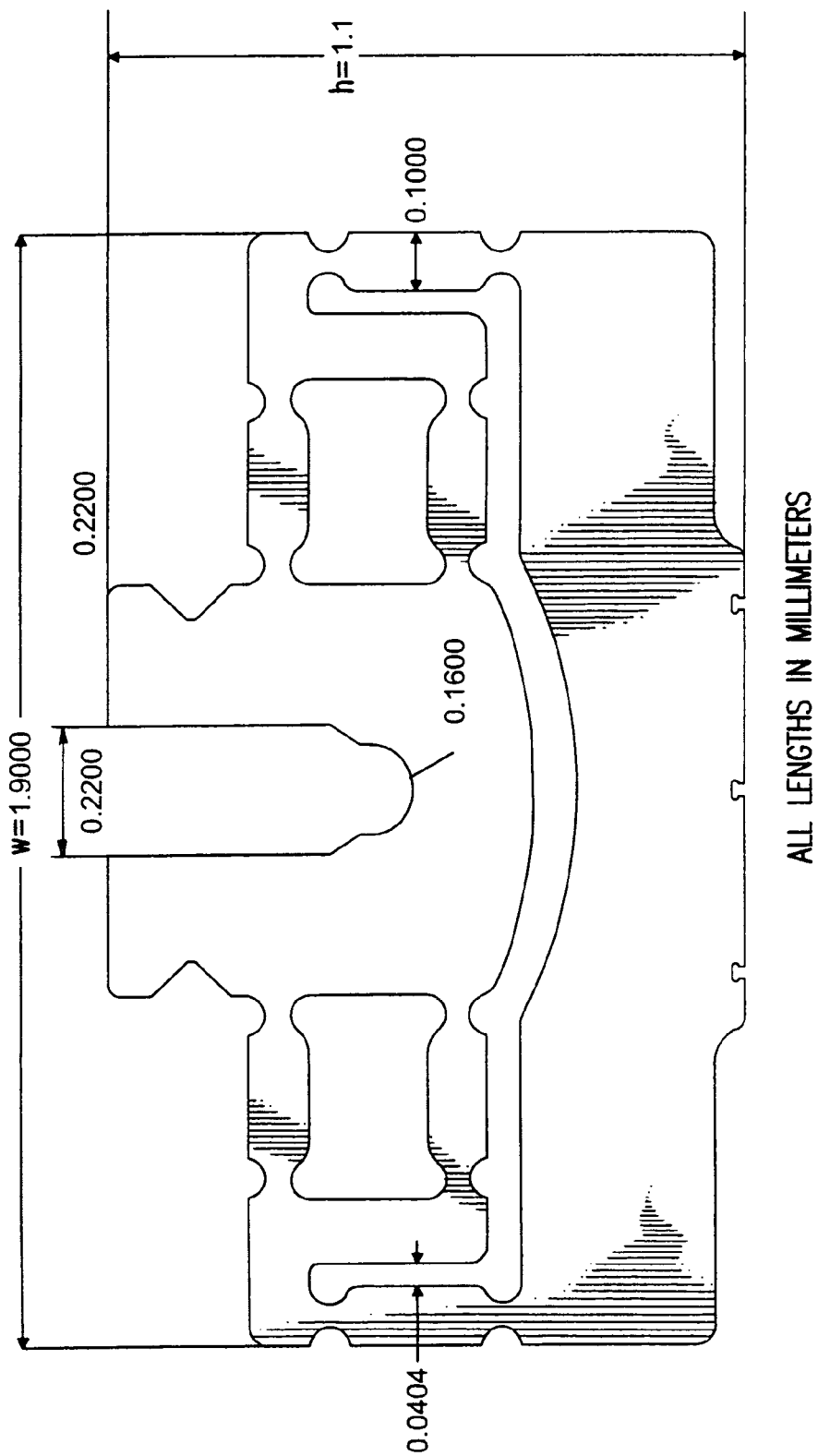
FIG. 3B is a front plan view showing the dimensions of the second embodiment structure.

FIG. 3B shows exemplary dimensions of the third embodiment. Specifically, the height h of the illustrated embodiment is 1.1 millimeters (mm). Generally the structures typically have height of greater than 0.5 mm to promote manipulation. To provide adequate clearance in standard packages, the structures are typically less then 2.0 mm in height. The width w of the illustrated structure is 1.9 mm. Here again, the width is preferably greater than 0.5 mm to facilitate stable installation on the bench. To provide acceptable component packing densities and clearance between components the width w of typically less than 4 mm is desirable.

Figure 4:
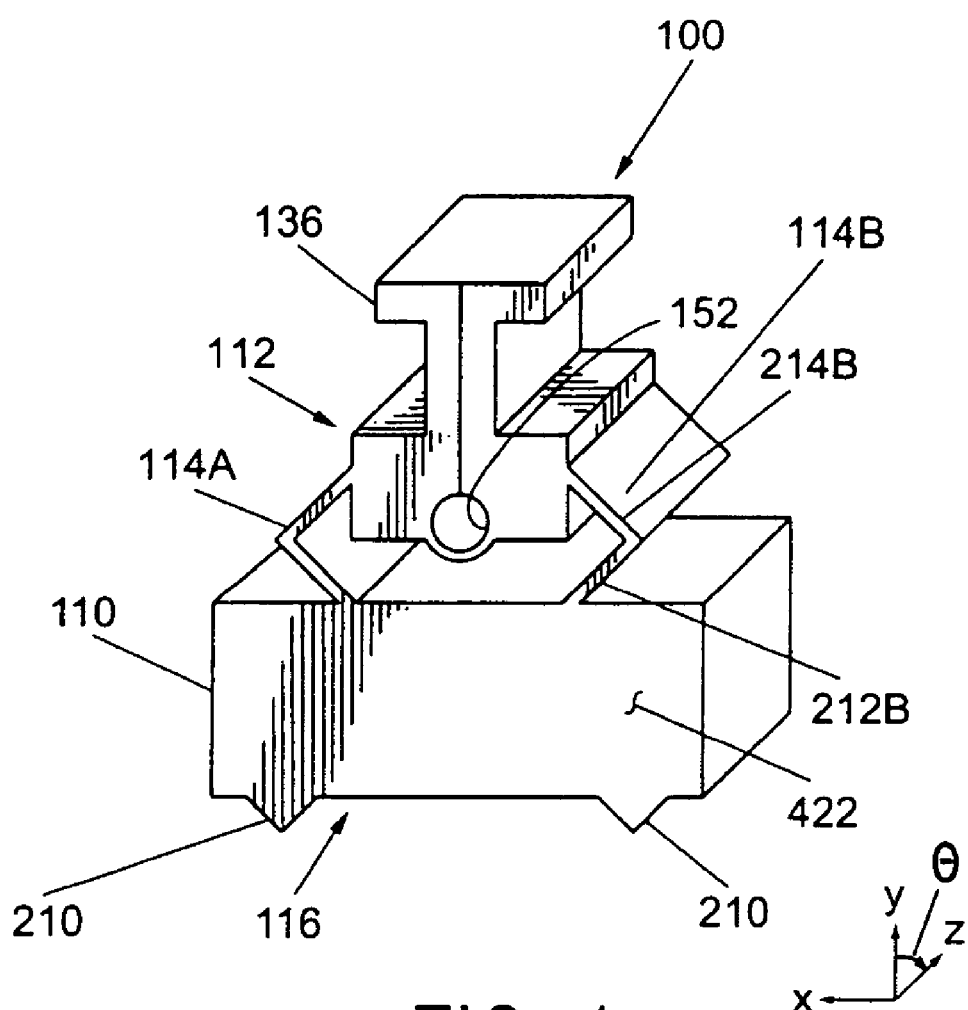
FIG. 4 is a perspective view showing a third embodiment of the mounting and alignment structure according to the present invention.

FIG. 4 shows a third embodiment mounting and alignment structure 100 that shares many similarities with the structures described in connection with FIGS. 1–3. It has a base 110 and laterally-extending base surface 116. Further, the third illustrated embodiment has an optical component interface 112 with an optical port 152. In this example, the handle 136 is more pronounced, extending vertically upward from the interface 112.

V-shaped alignment features 210 are provided on the base surface for engaging complementary V-shaped alignment trenches in the bench.

One of the more distinguishing characteristics is the armatures 114A and 114B. Instead of having segments that extend parallel to the x and y axes, each armature comprises two diagonally extending segments 212, 214 that intersect substantially at a right angle with respect to each other. Further, the armatures have no discrete flexure system but instead have a relatively constant cross-section along the length of the armatures.

Further, the optical component interface 112 comprises a relatively closed slot-shaped optical component mounting slot 152. In one embodiment, a fiber is inserted into the slot 152 and then the slot is crimped closed to secure the fiber therein. Further, a handle 136 is provided extending vertically from the optical component interface 112. In the illustrated example, the handle 136 has right and left extensions on either side of the slot 152.

Another distinction relative to the third embodiment of FIG. 4 is the use of a z-axis flexure. Specifically, the base 110 comprises a front plate portion 422 and a rear plate portion (not shown). Thus, the base 110 is a hollow box-configuration. The use of the Z-axis armature allows controlled flexing when stress is exerted in a rotational manner around the x-axis or θ direction.

Figure 5A:
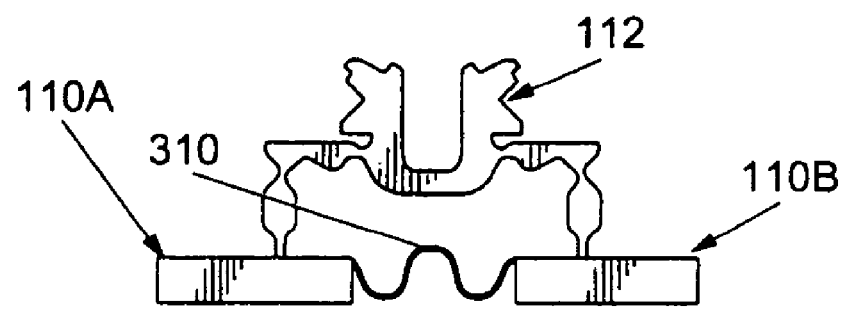
FIG. 5A is front plan view showing fourth embodiment of the inventive mounting and alignment structures.

FIG. 5A shows an embodiment in which the base is divided into two separate base portions 110A, 110B to promote a stable structure-bench interface while simultaneously minimizing the contact area subject to thermal expansion mismatch stresses. In order to make the device more robust during manufacturing of the structure and during its installation on the optical bench, a spring-like connecting element 310 connects the two halves of the base 110A, 110B. This element is clipped prior to installation or intentionally collapsed.

Figure 5B:
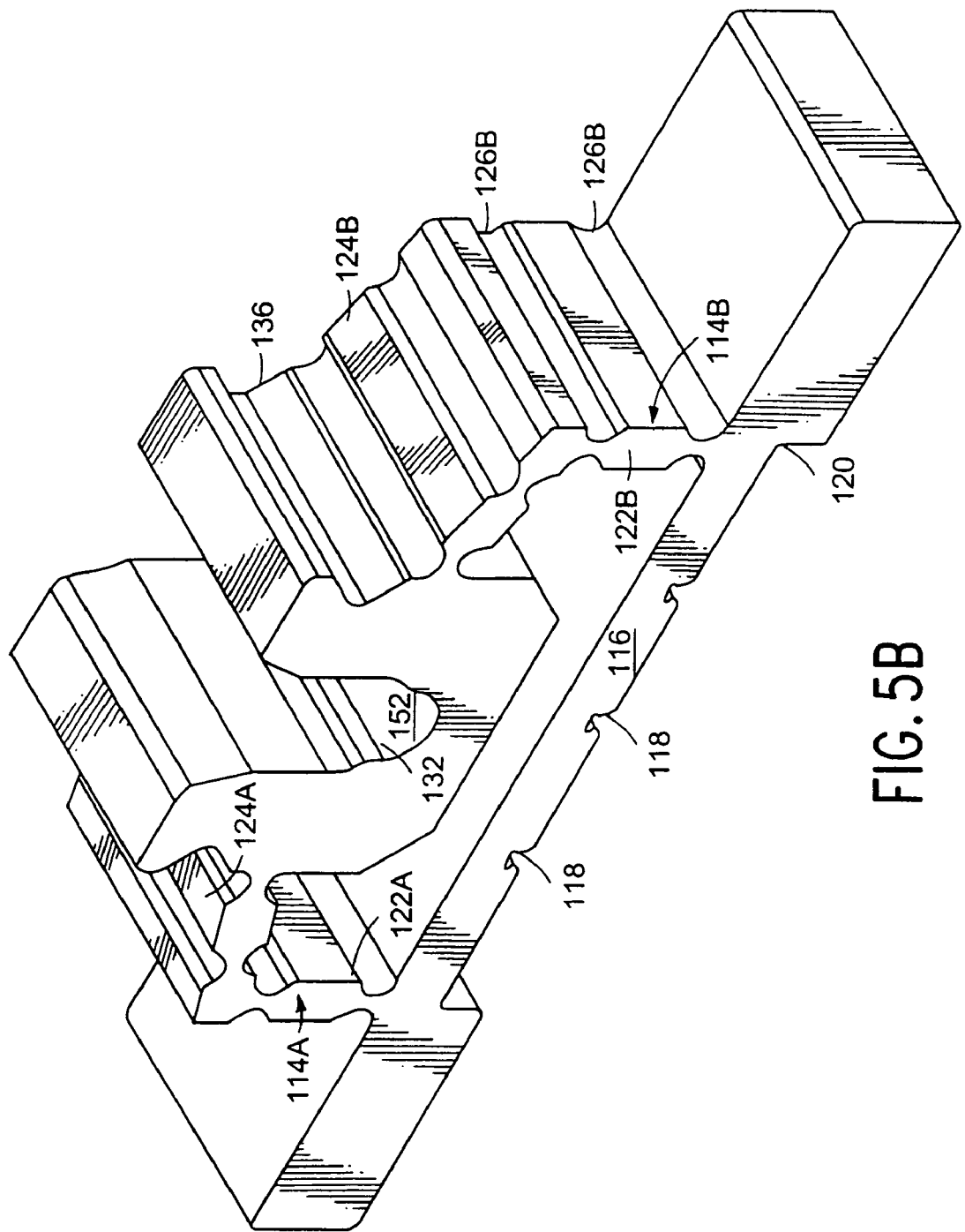
FIG. 5B is perspective view showing a related embodiment of the inventive mounting and alignment structures.

FIG. 5B shows a related embodiment with similar reference numerals indicating similar parts. This embodiment is notable in that the angle between vertically-extending segments 126 and the horizontally-extending segments 124 form an obtuse angle. In some applications this configuration facilitates alignment.

Figure 6:
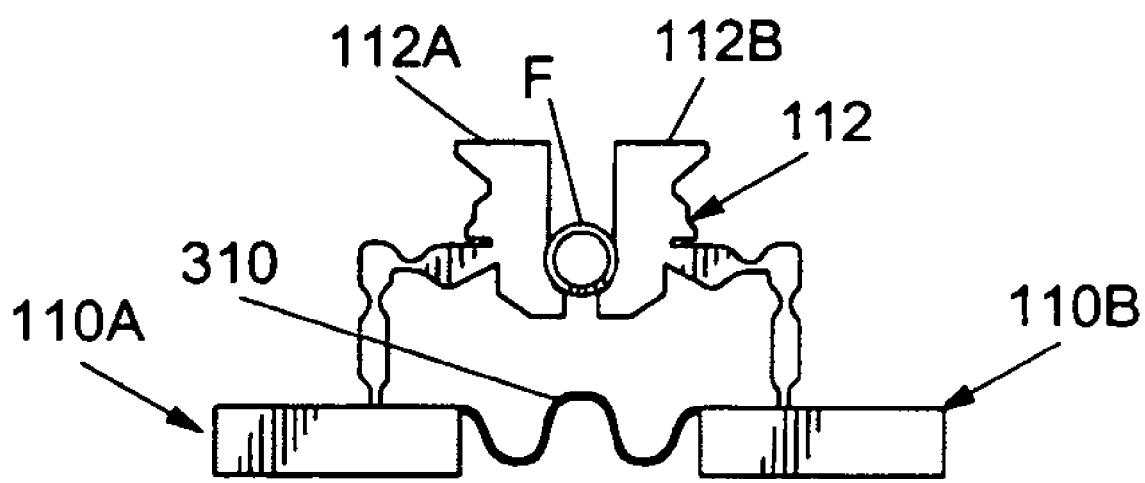
FIG. 6 is front plan view showing fifth embodiment of the inventive mounting and alignment structures.

FIG. 6 shows a fifth embodiment, being closely related to the fourth embodiment of FIG. 5A. Here, the optical component interface comprises two separate, divided portions 112A, 112B. In this embodiment, an optical component, such as an optical fiber f is inserted into the volumetric region between the two halves 112A, 112B of the interface. The two halves 112A, 112B are snapped closed around the fiber F.

Figure 7:
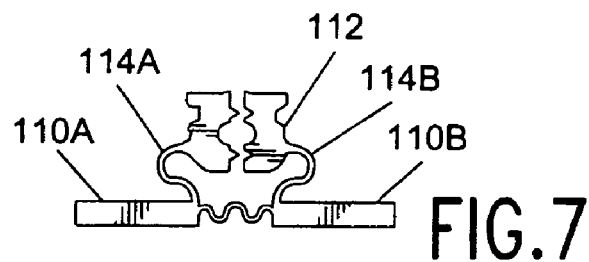
FIG. 7 is a front plan view of a sixth embodiment of the mounting and alignment structures accounting to the present invention.

FIG. 7 shows a sixth embodiment of a mounting and alignment structure. This embodiment is notable relative to the previously discussed embodiments in that the armatures 114A, 114B have continuous flexures distributed across the length of the armatures. The flexures are not located at specific flexure points as illustrated in some of the previous embodiments. In this embodiment, the armatures act as distributed flexing components that are subject to plastic deformation.

Figure 8:
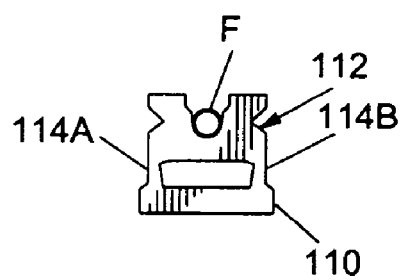
FIG. 8 is a front plan view of a seventh embodiment of the inventive mounting and alignment structures.

FIG. 8 shows a seventh embodiment of the mounting and alignment structures. This embodiment is notable in that the armatures 114A, 114B are relatively rigid such that they will resist any flexing or plastic deformation. Specifically, the armatures 114A, 114B have no discrete flexures as discussed relative to FIG. 1 nor do they have a continuous flexure system as illustrated in FIG. 7 as illustrated by the fact that the armatures are relatively thick. As a result, the embodiment of FIG. 8 is typically used mostly for mounting fibers that pass outside of the module or package through a fiber feed-through. The seventh embodiment resists strain to any stress exerted on, for example, a fiber F held in the interface 112.

Typically, the seventh embodiment is used in conjunction with a second mounting and alignment structure. The first mounting and alignment structure is proximate to the end of the fiber and enables alignment of the fiber end in the x, y plane. The seventh embodiment alignment structure is used to minimize the stress transmitted through the fiber to the structure used for fiber-end alignment.

Figure 9:
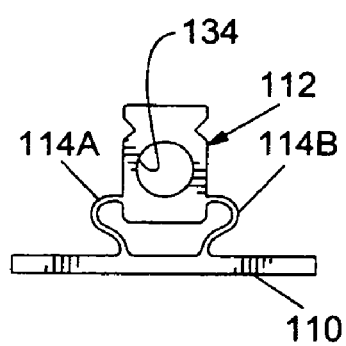
FIGS. 9 and 10 show eighth and ninth embodiments of the inventive mounting and alignment structures.

FIG. 9 illustrates an eighth embodiment with continuous flexure armatures 114A, 114B and an optical interface 112 that would be appropriate for an optical component other than an optical fiber. Specifically, a mirror or lens is mounted on the optical interface 112 by bonding such as solder or epoxy bonding. The port 134 enables optical access to that component in which an optical signal is reflected by the optical component or passes through the component thus also passing through the port 134.

Figure 10:
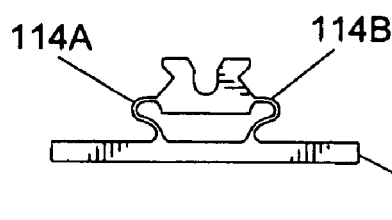

FIG. 10 shows ninth embodiment where the base 110 is a relatively wide one-piece base.

Figure 11:
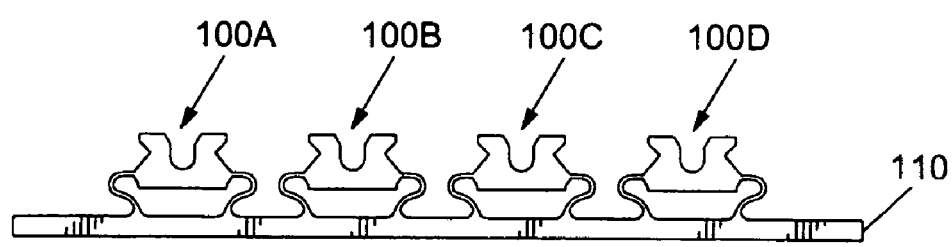
FIG. 11 is a front plan view of a tenth embodiment of the inventive mounting and alignment structures in which separate structures are integrated onto a single base according to the invention.

FIG. 11 shows another embodiment in which four structures 100A–100D are integrated on a common base 110. This system is useful for holding optical components, such as optical fibers for four physically parallel optical channels or paths. According to the invention, each optical fiber is separately aligned with separate alignment characteristics of the structures. The common base, however, enables multiple, simultaneous passive alignment of the structures/fibers in a single pick and placement step.

Figure 12:
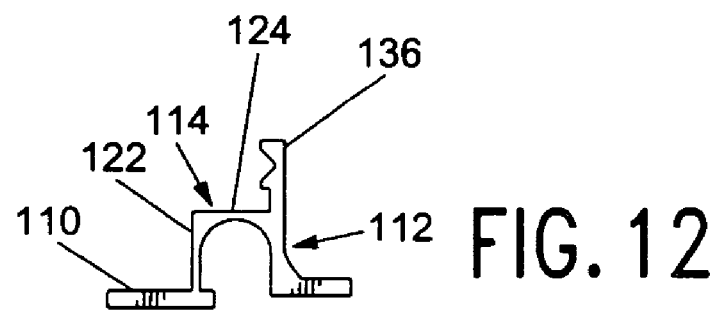
FIG. 12 is a plan view showing an eleventh embodiment of a mounting and alignment structure according to the present invention.

FIG. 12 shows a non-laterally symmetric mounting and alignment structure according to an eleventh embodiment. It comprises a base 110 and an armature 114 extending from the base vertically. The armature comprises a vertical segment 122 and a horizontally extending segment 124. The horizontally extending segment 124 terminates in a component interface 112. A handle 136 extends vertically from this interface.

Figure 13:
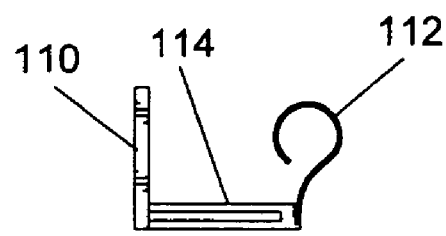
FIG. 13 is a plan view showing twelfth embodiment of the present invention.

FIG. 13 shows a non-laterally symmetric mounting and alignment structure according to a twelfth embodiment of the present invention. In this case, the base 110 extends in a vertical, y-axis direction such that it may be attached onto a side-wall of a module or another mounting and alignment structure. It further has a horizontally extending armature 114 and a component interface 112 adapted to hold a fiber concentrically in the center or abut against a fiber to improve its alignment.

Figure 14:
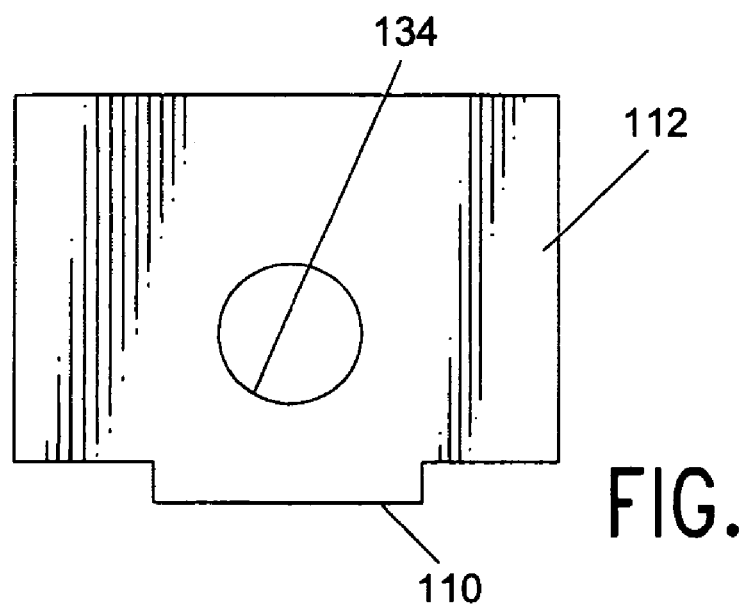
FIG. 14 is a plan view showing a thirteenth embodiment of an inventive mounting and alignment structure for passive component alignment.

FIG. 14 is a plan view of a mounting structure for exclusively passive mounting of an optical component. Specifically, the thirteenth embodiment has a base 112 and an integral optical component interface 112. It further has a port 134 for enabling access to the optical component. This embodiment does not have armatures and consequently is only susceptible to small alignment shifts. It is used mostly to hold components when their horizontal or vertical positioning is non-critical, such as, for example, a filter mirror in some system designs.

Figure 15A:
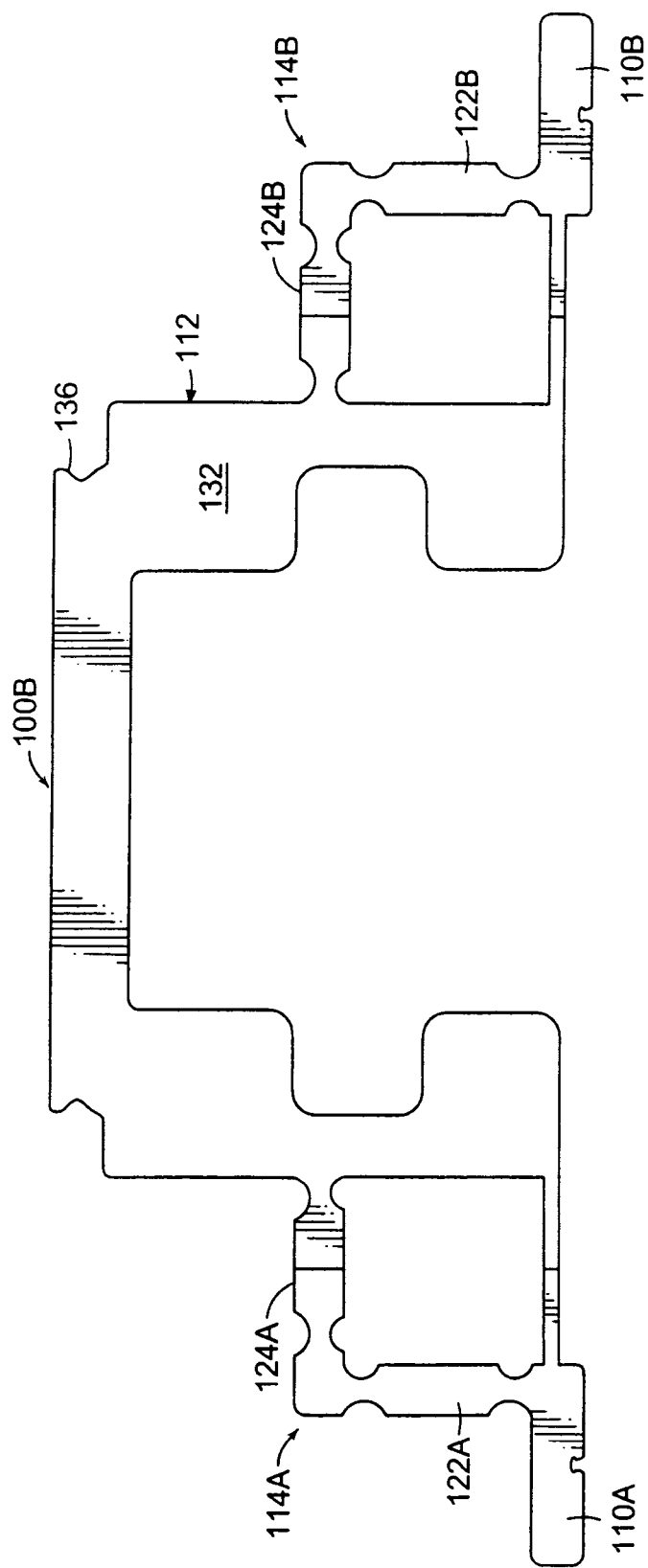

FIG. 15A shows a mounting and alignment structure for mounting relatively large MEMS filter device, in a current implementation.

Specifically, the fourteenth embodiment mounting and alignment structure has a divided base 110A, 110B. From each base, respective armatures 114A, 114B extend. The armatures each comprise a vertically extending portion 122A, 122B and a horizontally extending portion 124A, 124B. The optical component interface 112 is relatively large and is designed to hold an optical component mounted to the mounting surface 132, for example. The handle 136 is integral with the interface in this embodiment.

FIG. 15B illustrates the deployment of the fourteenth embodiment alignment structure 100B with one of the previously discussed alignment structures 100A. In typical installation and alignment, the mounting and alignment structure 100A is first installed on an optical bench 10. Alignment structure is then preferably deformed, in an active alignment process, for example, such that the optical component is properly located relative to the optical path. Subsequently, after the alignment of the optical component held by mounting and alignment structure 100A, the mounting structure 100B is installed with its own optical component. Then, this second alignment structure 100B is then tuned, in an active alignment process, for example, so that the second optical component is properly located in the optical path. The relative size differences between alignment structure 100A and 100B allows series alignments of their respective optical components even though the optical components are mounted in close proximity to each other on the bench 10.

Mounting Structure Manufacturing

Figure 16A:
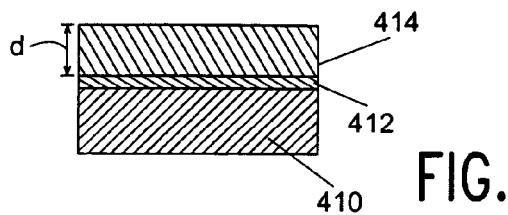
FIGS. 16A, 16B, 16C are cross-sectional views of the plating and lithography processes used to fabricate the mounting and alignment structures according to the invention.
Figure 16B:
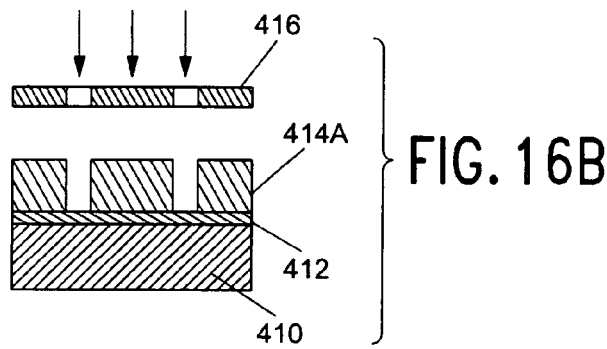
Figure 16C:
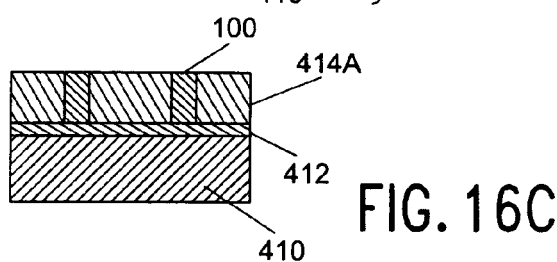

FIGS. 16A–16C are cross-sectional views of the mounting and alignment structures 100 during the manufacturing process.

Specifically, as illustrated in FIG. 16A, a thick PMMA resist layer 414 is bonded to a seed/release layer 412 on a substrate 410.

The depth d of the PMMA layer 414 determines the maximum thickness of the subsequently manufactured quasi-extrusion portion of the mounting and alignment structure. As a result, the depth determines the rigidity of the mounting and alignment structure 100 to forces along the Z-axis. In the preferred embodiment, the depth and consequently Z-axis thickness of the mounting and alignment structures is in the range of 500–1000 microns. Thicker structures are typically used for strain relief-type structures. According to present processes, the structures, and consequently the depth of the PMMA layer is as deep as 2000 microns to produce structures of same thickness.

FIG. 16B illustrates the next fabrication step in the mounting and alignment structure 100. Specifically, the thick PMMA resist layer is patterned by exposure to collimated x-rays. Specifically, a mask 416, which is either be a positive or negative mask having the desired pattern for the structure, is placed between the x-ray source such as a synchrotron and the PMMA layer 414. The PMMA layer 414 is then developed into the patterned layer 414A as illustrated in FIG. 16B.

FIG. 16C shows the formation of the quasi-extrusion portion of the mounting structure 100. Specifically, in the preferred embodiment, the quasi-extrusion portion is formed via electroplating. The preferred plating metal is nickel according to the present embodiment. Nickel alloys, such as a nickel-iron alloy, are used in alternative embodiments. Alternatively gold or a gold alloy is used in still other embodiments. Currently, alternative metal and alloys include: silver, silver alloy, nickel copper, nickel cobalt, gold cobalt and alloys laden with colloidal oxide particles to pin the microstructures.

Figure 17A:
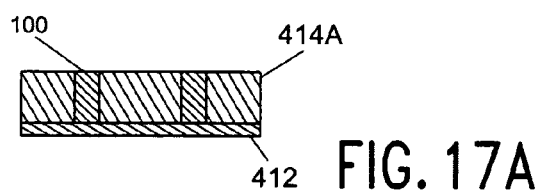
FIGS. 17A–17F illustrate a process for manufacturing mounting and alignment structures that have non-constant cross-sections along a z-axis for portions of structures.
Figure 17D:
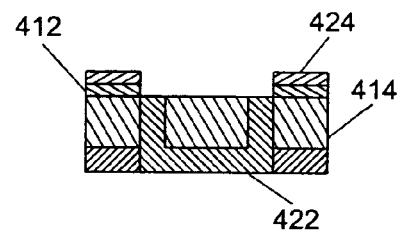
Figure 17B:
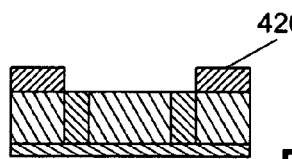

FIGS. 17A–17F illustrate a process of manufacturing the z-axis flexure 422 previously discussed with reference to FIG. 4. Specifically, as illustrated in FIG. 17A, after the formation of the quasi-extruded portion of the mounting and alignment structure, the substrate 410 is removed from the seed layer 412. Thereafter, an additional photoresist 420 layer is coated and then patterned as illustrated in FIG. 17B for one plate of the z-axis flexure. Thereafter, a further electroplating step is performed to fabricate the plate of the z-axis flexure 422 onto the existing cross-sectionally constant section 100.

Figure 17E:
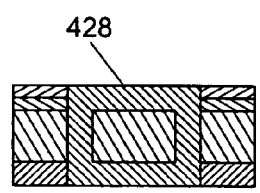
Figure 17C:
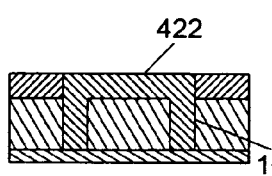
Figure 17F:
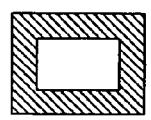

In FIG. 17D, a second photoresist is formed and then patterned on the reverse side of the structure 100 and first PMMA layer 414. The etching is performed through the seed layer 412. Another plating step is performed and the second plate of the z-axis flexure 428 is manufactured as illustrated in FIG. 17E. Thereafter, as illustrated in FIG. 17F, the remaining photoresist layer 424, seed layer 412, and PMMA layer 414 are removed leaving the hollow box-shaped structure illustrated. This box shaped structure forms the bottom base section 422 of the mounting and alignment structure illustrated in FIG. 4.

Mounting Structure-Optical Component Bench Installation

Figure 18A:
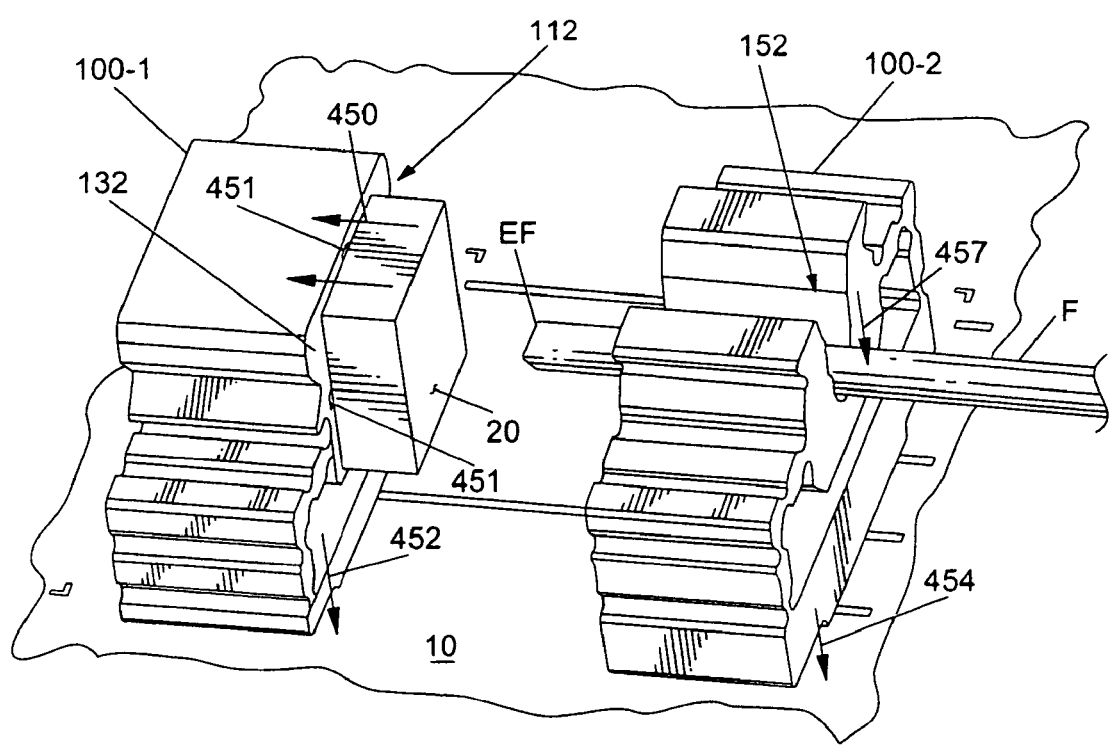
FIGS. 18A and 18B are a perspective diagram illustrating the process steps associated with installing optical components on the mounting and alignment structures and mounting and alignment structures on the optical bench.

FIG. 18A illustrates the process associated with installing optical components on the optical bench 10.

The bench is preferably constructed from mechanically robust, chemically stable, and temperature stable material, such as silicon, beryllium oxide, aluminum nitride, aluminum silicon carbide, beryllium copper. It is typically metal or ceramic coated with gold or a gold alloy for example.

Specifically, in a step 450, optical component 20 is installed on a first mounting and alignment structure 100-1. Specifically, the optical component 20 is preferably bonded to the mounting and alignment structure 100-1. In the preferred embodiment, a solder bonding is used in which solder is first applied to a periphery of the optical component and/or the bonding surface 132 of the optical component interface 112. Then the optical component is brought into contact with the mount surface 132 of the structure's component interface 112. The solder is then melted and allowed to solidify.

Also in the preferred embodiment, complimentary alignment features in the optical component 20 and the interface 112 facilitate alignment and proper seating between the component 20 and structure 100-1. Specifically, in alignment channels 113 (see FIGS. 1 and 2) are formed on the structure's interface. Marks or projections 451 on the optical component 20 engage the slots 113 to ensure reproducible installation of the component 20 on the structure 100-1.

In other embodiments, the component 20 is epoxy bonded or bonded using another adhesive bonding technique to the structure.

Then, in a structure-bench mounting step 452, the structure 100-1 is brought into contact with the optical bench 10 and bonded to the bench. In the preferred embodiment, solder bonding is used in which the bench is held in a heated chuck of a pick-and-place machine while the preheated structure is brought into contact with the bench. The heat is then removed to solidify the solder.

As illustrated in connection with alignment structure 100-2, for other optical components, the mounting steps are reversed. In this example, the mounting and alignment structure 100-2 is contacted and bonded to the bench in a structure-bench bonding step 454. Thereafter, the optical fiber F is seated in the U-shaped port 152 in step 457 of the mounting and alignment structure 100-2. Thereafter, the fiber is either bonded to the interface bonding surface 132 or the U-shaped slot is crimped such that the fiber is secured in the bottom of the U-shaped port. Thus, the fiber endface EF is secured to the optical bench in proximity to the optical component, such as thin film filter or mirror 20, held by structure 100-1.

Figure 18B:
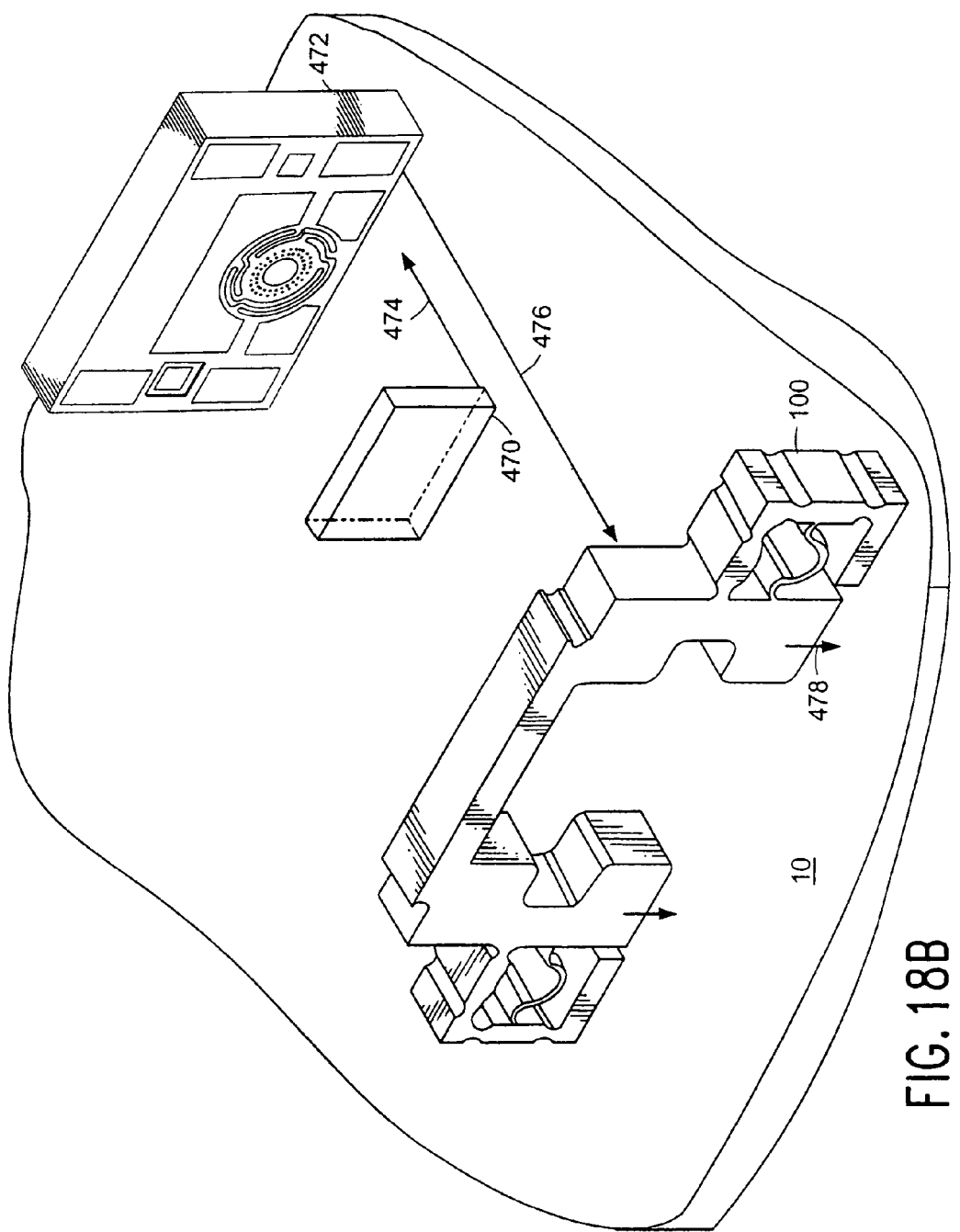

FIG. 18B also illustrates the process associated with installing MEMS-type optical components on the optical bench 10. Specifically, in this embodiment, a front mirror 470 is first bonded over a reflective membrane of the MEMS device 472 in a first bonding step 474. Then, the MEMS device 472 is bonded to the alignment structure 100 in a second bonding step 476. Then in a bench-bonding step 478, the composite MEMS/structure is bonded to the bench 10.

Mounting Structure Deformation in Alignment

Figure 19:
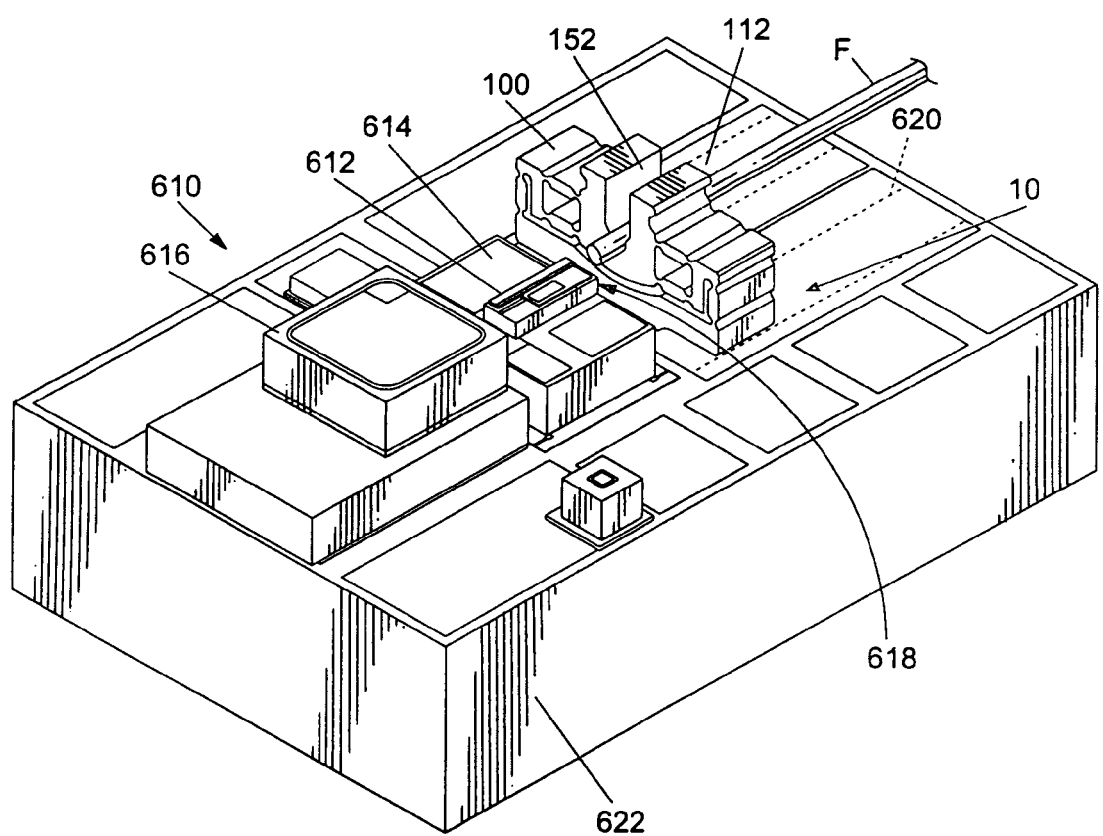
FIG. 19 is a perspective drawing of a laser optical signal source that couples a beam into an optical fiber held by a mounting and alignment structure, according to the present invention.

FIG. 19 is a perspective view of a fiber optic laser optical signal source system, which has been constructed according to the principles of the present invention. Specifically, the laser source system 610 comprises a laser chip 612, which has been mounted on a hybrid substrate 614. Typically, this substrate supports the electrical connections to the chip 612 and possibly also comprises a thermoelectric cooler for maintaining an operating temperature of the chip 612. The hybrid substrate 614 is in turn installed on an optical bench portion 10 of a package substrate 622. A detector 616 is located behind the chip 612 on the bench 10 to detect rear facet light and thereby monitor the operation of the laser 612.

Light emitted from a front facet 618 of the chip 612 is collected by a fiber f for transmission outside the optical system 610. In one implementation, the light propagating in fiber f is used to optically pump a gain fiber, such as a rare-earth doped fiber or regular fiber in a Raman pumping scheme. In other implementations, the laser chip 612 is modulated in response to an information signal such that the fiber transmits an optical information signal to a remote detector. In still other implementations, the laser chip 612 is operated to run in a CW mode with modulation performed by a separate modulator such as a Mach-Zehnder interferometer.

An optical component mounting and alignment structure 100, according to the invention, is installed on the optical bench portion 10 of the package substrate 622. As discussed previously, the optical bench has alignment features 620, which mate with opposite-gender alignment features on the base surface of the mounting and alignment structure 100 as described previously in connection with FIG. 1, for example.

As also discussed previously, the fiber f is installed in the U-shaped port 152, which is part of the optical component interface 112 of the mounting and alignment structure 100.

Figure 20:
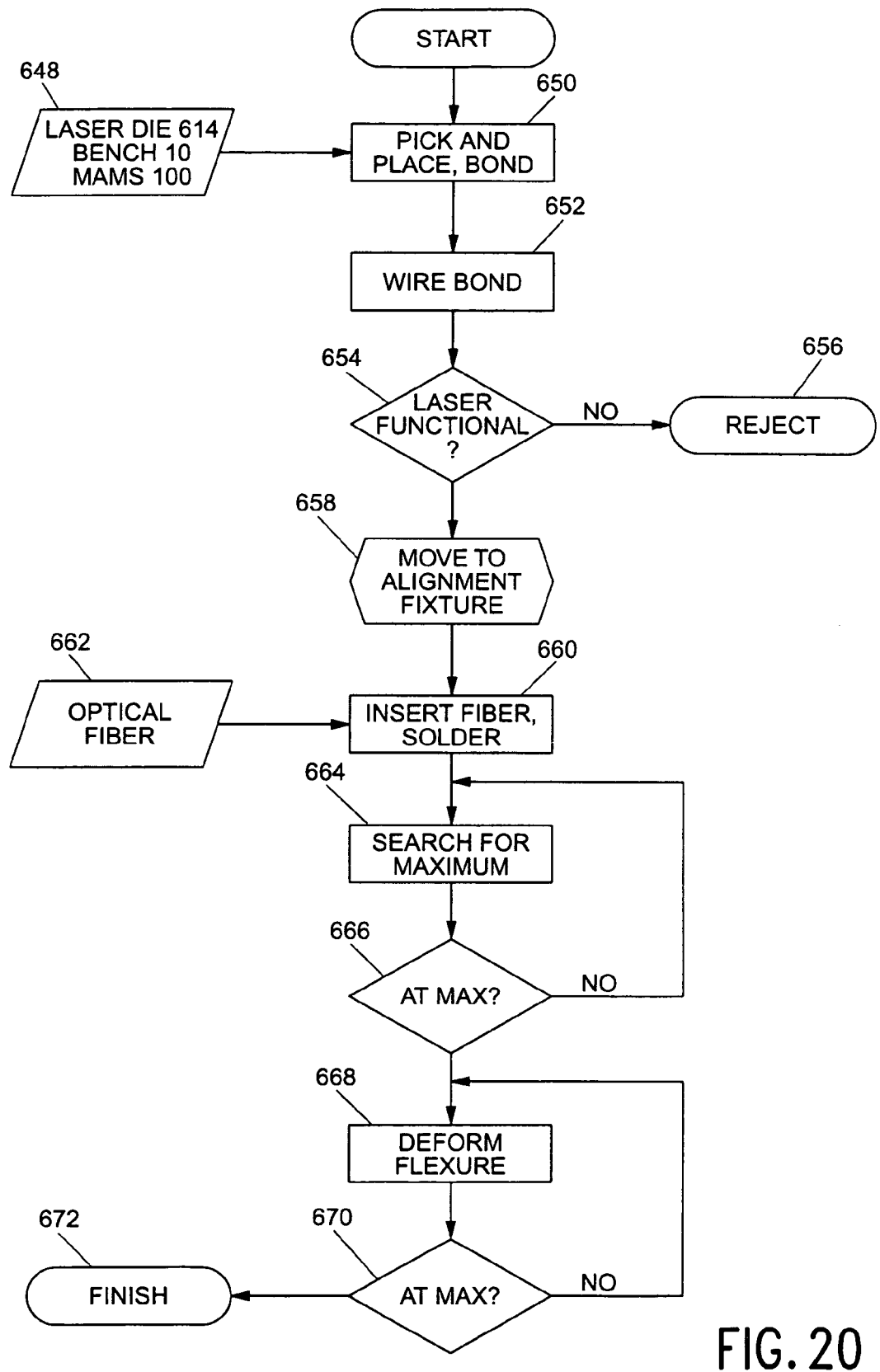
FIG. 20 is a process diagram illustrating the optical system active alignment process according to the present invention.

FIG. 20 is a process diagram illustrating the active alignment process that is used in conjunction with the deformable optical component mounting structures in the manufacture of an optical signal source as illustrated in FIG. 19, for example.

Specifically, in step 650, a laser die 614 and alignment structure 100 are mounted to the optical bench 10 in a pick-and-place and bonding process. Specifically, a pick-and-place robot locates the die 614 and the alignment structure 100 on the optical bench 10 using passive alignment. The alignment process is preferably accomplished using machine vision techniques and/or alignment features in the laser bench 10, and mounting and alignment structure 100, and die 614, or explicitly relative to a defined coordinate system of the bench 10/module 622.

In step 652, once the laser hybrid 614 and structure 100 are attached to the bench 10, wire bonding is performed to the laser hybrid. Then, in step 654, the laser 612 is electrically energized to determine whether or not the laser is functioning properly.

If the laser is not functioning, then the optical system is rejected in step 656.

If, however, the laser is determined to be operational in step 654, the bench is moved to an alignment fixture of the production system in step 658.

In step 660, the fiber f is inserted into the U-shaped port 152 of the optical component interface 112 and bonded there. In the preferred embodiment, the fiber is solder bonded to bonding surface 132.

In step 664, the alignment system grasps or engages the mounting and alignment structure 100 to deform the mounting and alignment structure 100 in response to a strength or magnitude of a signal transmitted by the fiber f from the laser 612.

Figure 21:
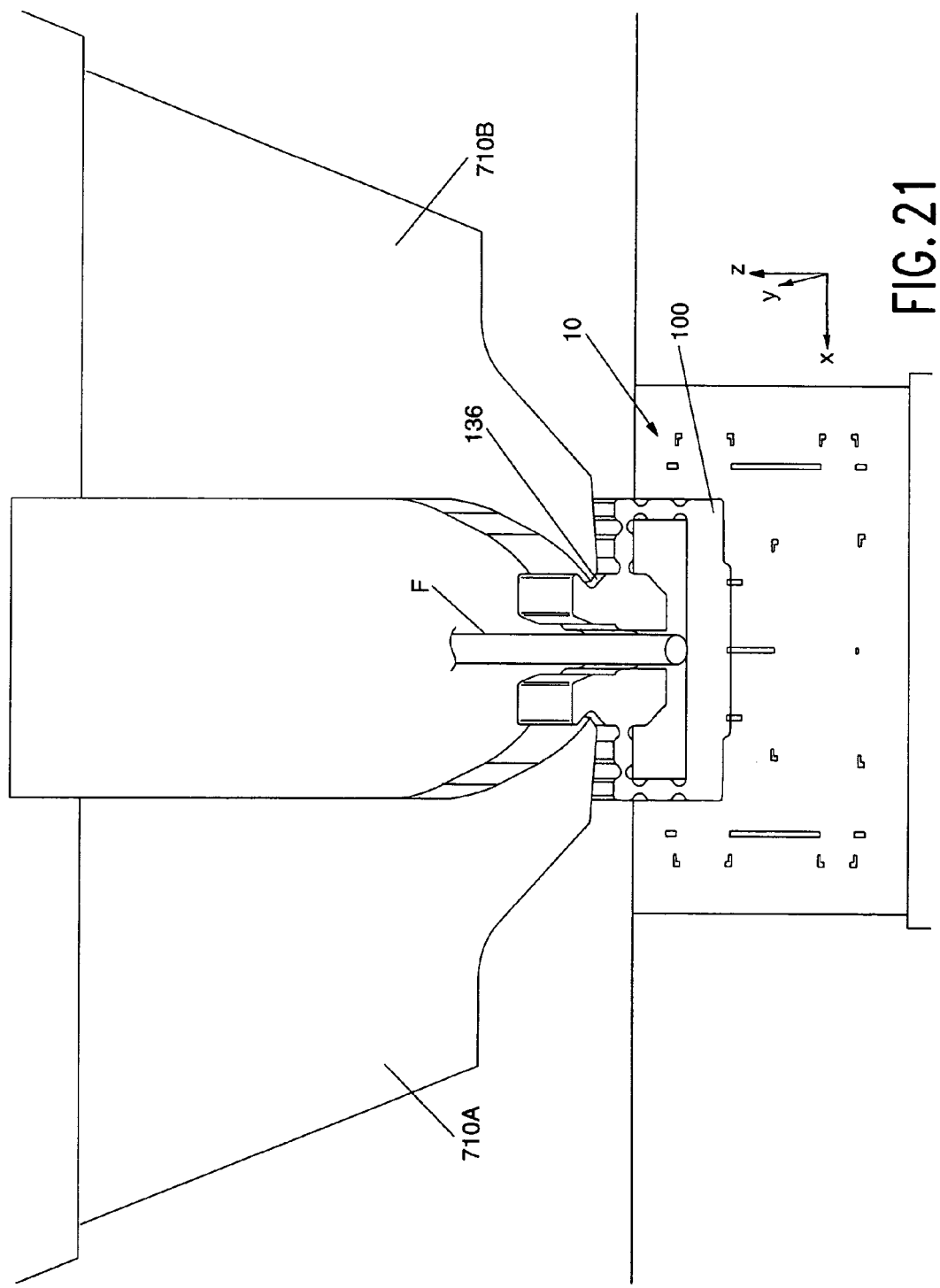
FIG. 21 is a perspective top view showing the jaws of an aligner engaging the handle of a mounting and alignment structure to deform the structure during an alignment process.

FIG. 21 illustrates the engagement between the alignment system and the mounting and alignment structure 100 to align the fiber f. Specifically, the two jaws 710A, 710B engage the handles 136 of the mounting and alignment structure 100 and then move the mounting and alignment structure to displace the fiber f in an x-y plane, which is orthogonal to the axis of the fiber f. Simultaneously, the magnitude of the signal transmitted by the fiber is monitored until a maximum signal is detected in step 666 of FIG. 20. Of note is the fact that the right and left cut-outs of the handle 136 enable the jaws of alignment system to both pull and push the structure away and toward the bench 10, as needed to achieve an optimal alignment.

Returning to FIG. 20, once the maximum signal is detected in step 666, the alignment system further deforms the mounting and alignment structure 100 such that when the mounting and alignment structure is released, it will elastically snap-back to the desired alignment position detected in step 666. In other words, the mounting and alignment structure is plastically deformed such that it will have proper alignment when the jaws 710A, 710B of the alignment system disengage from the mounting and alignment structure 100.

If it is subsequently determined in step 670 that the optical component, i.e., the fiber is not at the position associated with the maximum coupling, the deformation step 668 is performed again until the position is within an acceptable tolerance.

Figure 22:
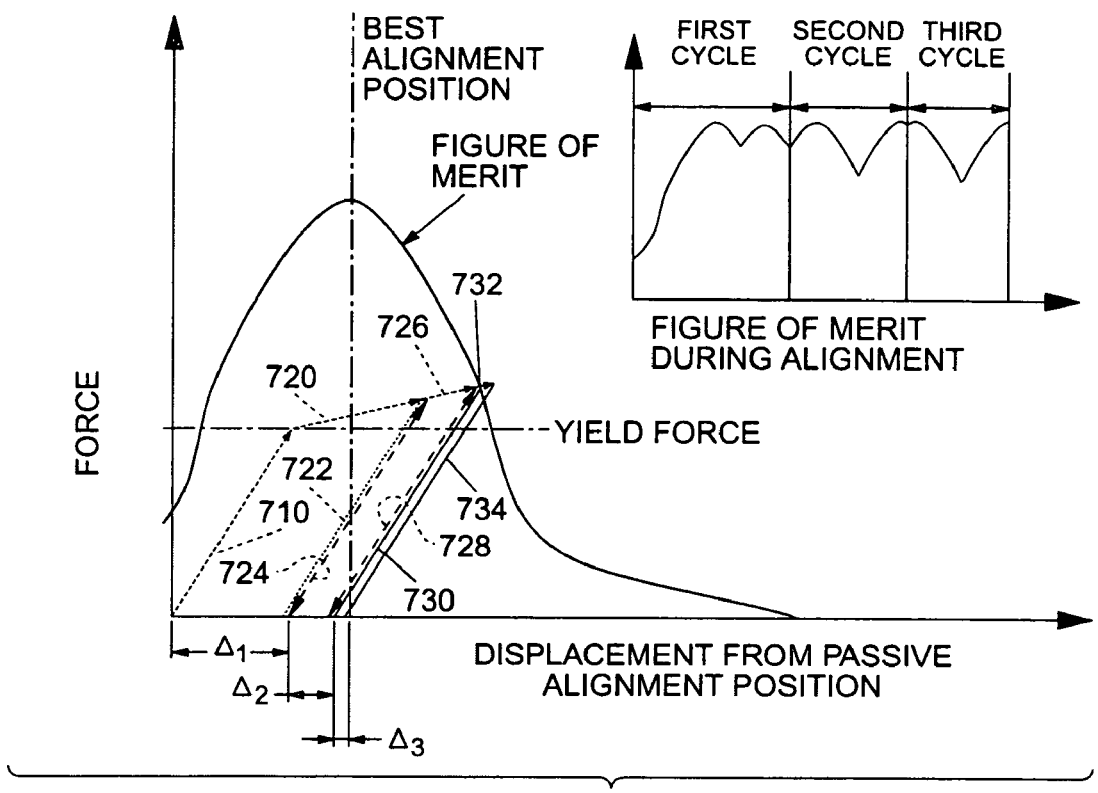
FIG. 22 is a plot of force and optical response on the vertical axis as a function of displacement or strain on the horizontal axis illustrating the inventive alignment process.

FIG. 22 is a plot illustrating the alignment process. Specifically, the figure of merit or the coupling efficiency of light into the optical fiber is plotted as a function of displacement of the optical fiber. Specifically, the coupling efficiency is maximized when the fiber is located at the best alignment position and falls off on either side of this position.

FIG. 22 also illustrates force or stress as a function of strain or displacement during the several steps of the alignment process. Specifically, in a first step 710, force is exerted on the mounting and alignment structure, such that it undergoes elastic deformation. In this regime, there is a substantially linear relationship between the applied force, on the y-axis and the displacement or strain on the x-axis. Once the yield force level is exceeded, however, the mounting and alignment structure 100 undergoes plastic deformation as illustrated by line 720. This plastic deformation results in permanent deformation to the mounting and alignment structure.

When force is removed, the mounting and alignment structure undergoes elastic "snap-back" as illustrated by step 722. That is, with the force removed, the structure undergoes some elastic movement. However, because the yield force level was exceeded, the mounting and alignment structure has been permanently deformed as indicated by distance $\Delta_1$.

Even with this plastic deformation, the fiber is still not at the best alignment position. As a result, another cycle of plastic deformation is performed. Specifically, force is applied such that the mounting alignment structure undergoes elastic deformation as illustrated by line 724. Once the new yield force level has been exceeded a second time, it then undergoes plastic deformation as indicated by line 726. The yield force has increased during this second alignment cycle due to work hardening. Force is then removed and the mounting and alignment structure undergoes elastic snap-back as illustrated by line 728.

This second plastic deformation step, since it exceeded the yield force, resulted in movement toward the best alignment position of $\Delta_2$.

Nonetheless, if optimal alignment is to be achieved, more plastic deformation must be performed. Specifically, again the elastic deformation is performed in step 730 until the yield force is reached. Then, a small amount of plastic deformation is performed as indicated by line 732. Force is removed and the mounting alignment structure now snaps back to the best alignment position as indicated by line 734.

The graph insert shows the figure of merit during the alignment process. During the first plastic deformation cycle, the position passes through the best alignment position, but after force is removed, the elastic snap-back pulls it out of best alignment. During the second deformation cycle, the best alignment position is again passed and exceeded. This second cycle, however, improves the alignment once force is removed. Finally, the third cycle brings the fiber into the best alignment position.

Mounting Structure Design Criteria

Figure 23:
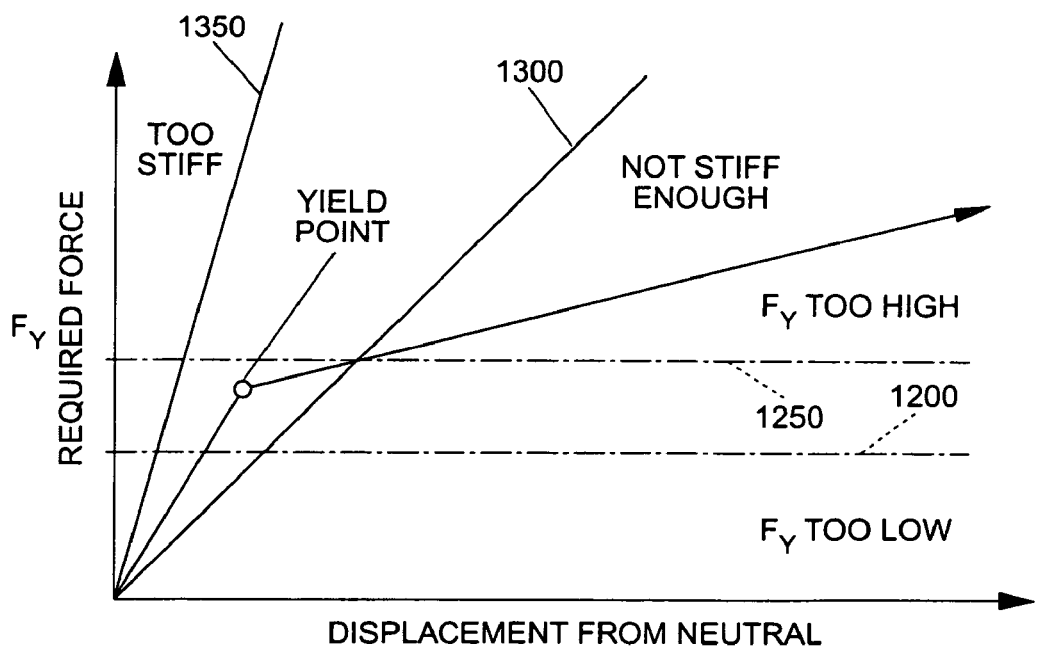
FIG. 23 is the plot of force along the y-axis as a function of displacement illustrating constraints in the selection of the yield force.

FIG. 23 presents a plot of force, $F_Y$, as a function of displacement that can be employed in accordance with the invention to design the armatures for a given application. The yield force is the force at which the structure begins to undergo plastic deformation from an elastic deformation regime.

The lower bound on $F_Y$ (1200) is constrained by environmental shock, i.e., acceleration, and by the possible forces to which the mounting structure might be subjected during handling. Some specifications require optical systems to withstand 5000 g shock-tests. Typically with some optical elements, yield forces of greater than 0.5 Newtons are typically required. This number, however, can be reduced as the size and thus mass of optical elements is reduced. Were there no minimum yield force constraint, the unavoidable forces produced during handling, including fabrication, heat treatment, plating, pick and place, alignment, packaging, and other processes, could cause plastic deformations of the flexure joints. More seriously, any shock to an aligned system might misalign it, defeating one of the purposes of the invention.

The upper bound on $F_Y$ (1250) is constrained by three factors. First, the force required to cause plastic deformation of an armature or flexure must not be so high as to weaken or destroy the bond between the mounting structure and the substrate. Second, the yield force must not be so high as to cause significant elastic deformation in the micromanipulator that is applying the force. Third, the force required to deform the armature or flexure must not be so high as to damage other portions of the integrally-formed mounting structure.

In addition to constraining the armature yield force, it is also preferred to constrain how much displacement is required in order to reach the yield point. The lower bound (line 1300) is dictated first by the physical range of the structure. A mounting structure only functions as desired if there is enough plastic deformation range to reach the aligned position. Generally, the alignment structures need to enable movement or placement of the optical component of 0 to 50 microns. The typically alignment algorithms require plastic deformation that yields 4 to 5 microns of movement in the position of the optical component to reach alignment. The second constraint on the minimum stiffness is determined by the amount of "overshoot" deemed acceptable by the alignment algorithm. If the structures are too elastic, then they must be pressed a long distance beyond the desired alignment point in order to make even a small alignment adjustment.

The final constraint is the maximum stiffness of the flexures (line 1350). Were work hardening not an issue, there would be no constraint on maximum stiffness (except, of course, material limitations). With nickel and nickel alloys, however, work hardening occurs. Therefore, the stiffness upper bound is selected so that line 1250 is not exceeded even with work hardened created by successive plastic deformation cycles performed during the search for the correct alignment.

In the preferred embodiment, $F_{Y,y}$, i.e., the yield force in the direction of the y-axis, is less than 3 Newtons (N), typically between 0.2 and 1 N. The yield force along the x-axis, $F_{Y,x}$ is similarly limited to less than about 3 Newtons, typically between 0.2 and 1 N. Yield forces below 0.2 N are viable if smaller optical component are used, however. These lower limits are related to the mass of the optical component that the structure must restrain without unintended plastic deformation. Thus, lower yield forces are possible with smaller components in subsequent product generations.

In contrast, the yield force the z-axis direction, i.e., $F_{Y,z}$ or $F_{Y,\theta}$, is much larger to promote alignment in only the x-y plane. Preferably, $F_{y,z}$ or $F_{y,\theta}$ are greater than 5 N or 10 N. Further, especially in versions of the alignment structures that are used to secure fiber pigtails to benches. Thermal expansion mismatches resulting stresses on the fibers. The objective is to design the structures so that such stresses result in as little movement in the fiber endface as possible. Especially any rocking motion is desirably avoided by balancing the structures by selecting the location of where the armatures attach to the fiber component interface.

Further Embodiments

Figure 24:
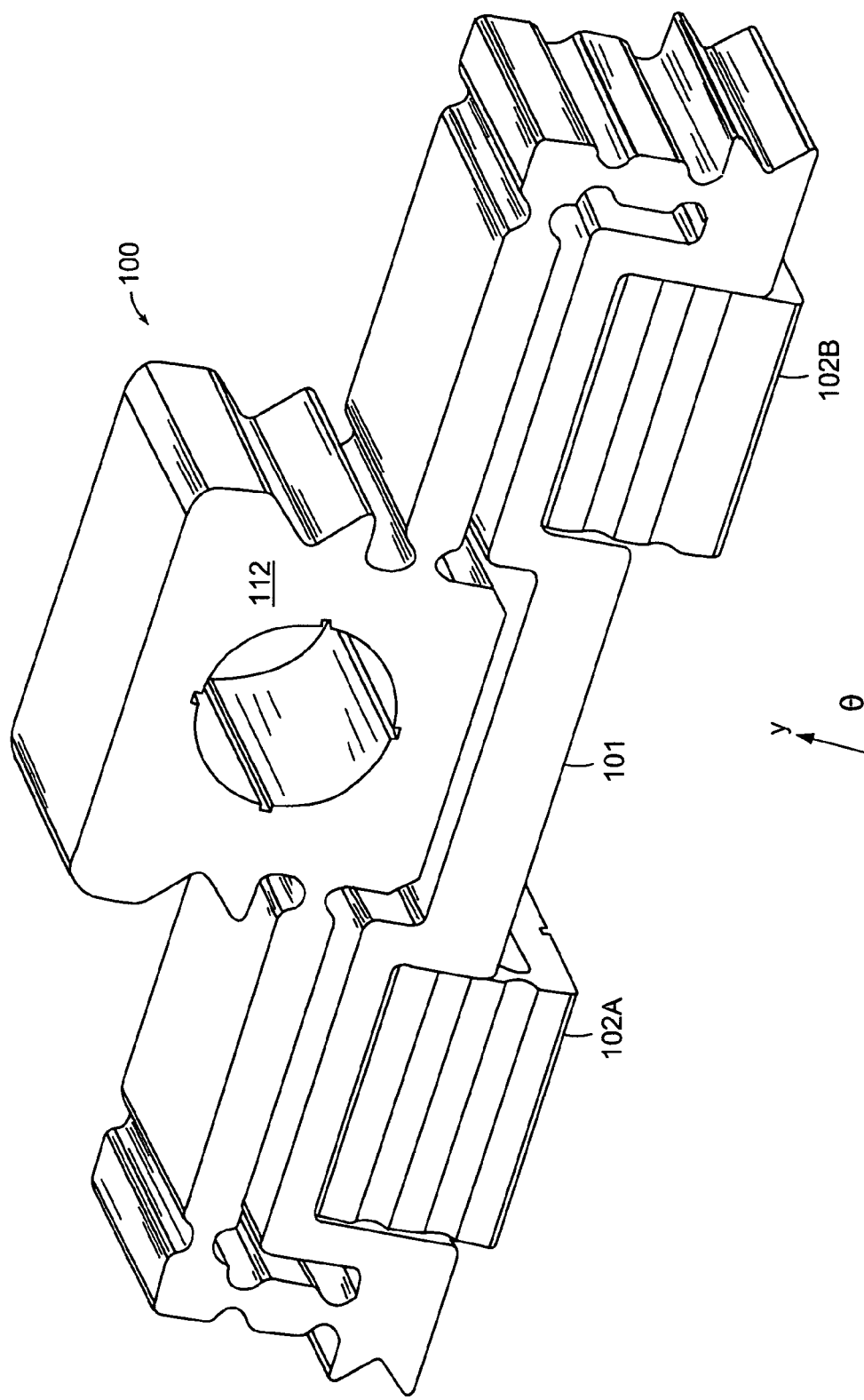
FIG. 24 is a perspective view showing a fifteenth, composite structure embodiment of the invention.

FIG. 24 illustrates another embodiment of the invention in which the structure 100 is a composite of an extrusion-like portion 101, which has a constant cross section along the z-axis, and two z-axis flexure pieces 102, which control rotation around the x-axis or in the direction of angle $\Theta_x$, thereby determining the resistance to force components along the z-axis. Preferably on the z-axis flexure pieces 101 are separately fabricated and bonded to base surface of portion 101. Base surfaces of the pieces are then bonded to the bench.

Figure 25:
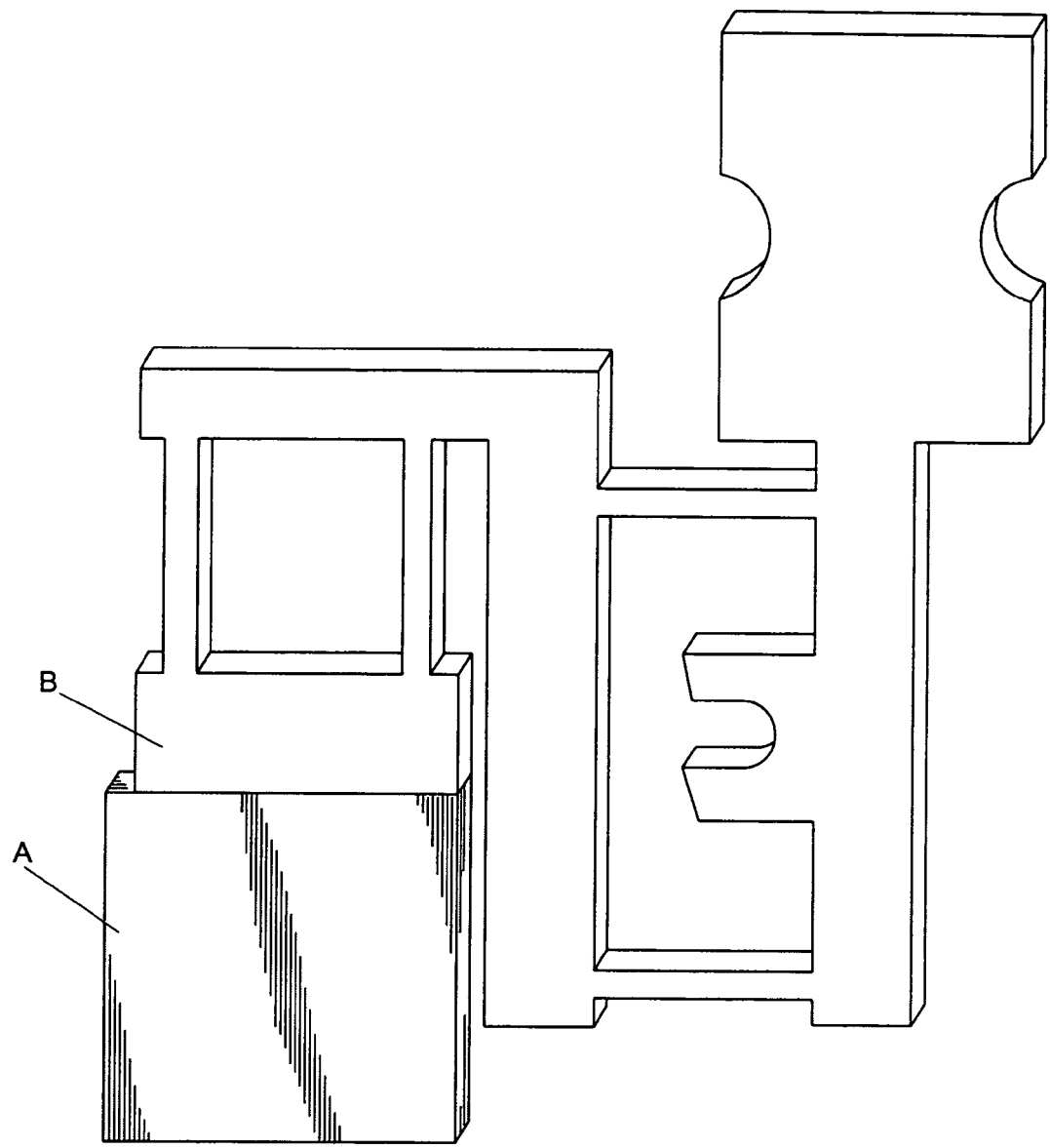
FIG. 25 is a schematic perspective view of a sixteenth, dual material embodiment of the invention.

FIG. 25 is an example mounting structure provided by the invention wherein two different materials (indicated as "A" and "B") are employed in the mounting structure for minimizing any change in optical axis location due to thermal expansion and/or contraction of the structure. In one example configuration, the "A" material is selected, in combination with the design of that region of the structure, to expand upward due to temperature change, while the "B" material and its corresponding mounting design features are selected for a tendency to expand downward due to temperature change. These opposing expansion tendencies result in a compensating action that produces stability in structure geometry and position across a range of operational temperatures.

Optical System Production Line

FIG. 26 schematically illustrates the manufacturing sequence for optical systems according to the principles of the present invention. Generally, process comprises precision pick and place to locate the optical component to an accuracy of better than 10 microns, better than two microns in the preferred embodiment, followed by active alignment in which the position of the component is trimmed to an accuracy of about a micron, preferably better than a micron.

Specifically, an alignment structure supply 2010, such as a gel pack or other machine-vision compatible holder, is provided along with a similarly configured optical component supply 2012.

Each of the supplies is accessed by a pick-and-place machine 2014. Specifically, the pick-and-place machine applies the optical components to the alignment structures and bonds the components. Typically, either the alignment structures and/or the optical components are solder coated or solder performs are used. The pick-and-place machine heats the alignment structure and the optical components and brings the two pieces into contact with each other and then melts and resolidifies the solder.

In the current embodiment, the pick-and-place machine is manufactured by Karl Süss, France, type FC-150 or FC-250. These pick-and-place machines have a vacuum chuck for picking-up the optical components and a holder for holding the alignment structures.

The alignment structures, with the affixed optical components are then fed to a separate or the same pick-and-place machine, which has access to an optical bench supply 2018. In this second pick-and-place operation, the pick-and-place machine 2016 holds the optical bench on a vacuum chuck or holder and then applies the alignment structure, with the optical component, to the optical bench using its vacuum chuck. The bench and structure are then heated to effect the solder bonding. Further, by matching alignment features of the benches and alignment features of the mounting structures, placement accuracies of less than 5 microns are attainable. In the preferred embodiment, the structures are located on the bench with accuracies of better than 2–3 microns in a production environment.

In the preferred embodiment, the optical benches, with the alignment structures affixed thereto are then fed to an alignment system. This alignment system 2020 has the jaws 710A, 710B which grasp the handle of the alignment structure 100 to effect alignment. In the preferred embodiment, this alignment is active alignment in which the magnitude of the optical signal 2022 is detected by a detector 2024. The alignment structure 100 is manipulated and deformed until the optical signal 2022, detected by the detector 2024, is maximized. Alignment search strategies such are a hill-climbing approach or spiral scan approach are preferably utilized.

In other situations, such as when installing optical fibers on the bench 10, the alignment structure is preferably installed first without the fiber attached by the pick and place machine 2016. Then at the alignment system, the fiber is fed through a fiber feed-through in the module and attached, such as by solder bonding, to the alignment structure 100. Then the alignment system manipulates the structure to effect alignment.

Once aligned, the optical bench and module is then passed to a lid sealing operation 2026 where the final manufacturing steps are performed such as lid sealing and baking, if required.

Figure 27A:
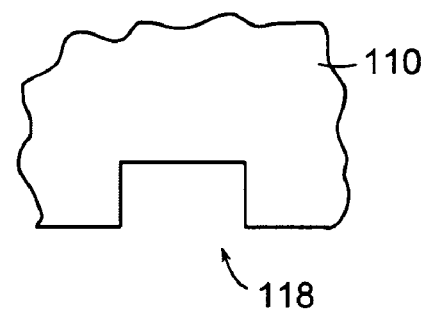
FIGS. 27A, 27B, and 27C are partial plan views of the mounting and alignment structures showing three different configurations for the alignment channels.
Figure 27B:
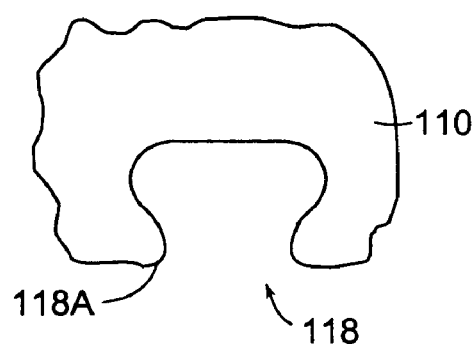
Figure 27C:
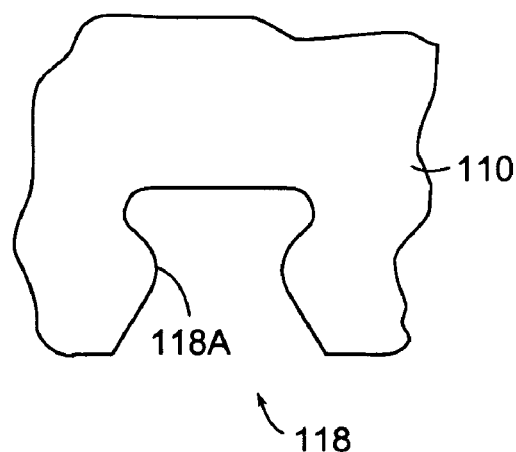

FIGS. 27A, 27B, and 27C illustrate three different configurations for the alignment channels 118 introduced in FIG. 1.

FIG. 27A is the simplest design, but has a drawback associated with implementation in machine vision applications when the base surface is pre-coated with solder, or other bonding agent. Solder fills in the creases and smoothens the channel's edges making alignment based on the features potentially less accurate.

FIGS. 27B and 27C show channels incorporating cavities in the features that facilitate the identification of edges 118A even after solder coating. The resulting clear edge features, even after coating, facilitate alignment during bench installation.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical system production method, comprising
supplying optical benches from an optical bench supply;
supplying optical components from a component supply;
receiving optical components from the optical component supply and optical benches from the optical bench supply at a pick-and-place machine;
attaching the optical components to the optical benches with the pick-and-place machine;
characterizing positions of the optical components, which have been attached to the optical benches; and
mechanically adjusting the relative positions of the optical components with an optical system aligner.

2. An optical system production method as claimed in claim 1, wherein the step of attaching the optical components to the optical benches with the pick-and-place machine comprises solder bonding the optical components to the optical benches.

3. An optical system production method as claimed in claim 1, wherein the step of characterizing the positions of the optical components comprises:
the optical system aligner activating optical links of optical systems;
detecting optical signals after interaction with at least some of the optical components; and
adjusting the optical components to optimize transmission of the optical signals in the optical systems.

4. An optical system production method as claimed in claim 1, wherein the step of characterizing the positions of the optical components comprises:
energizing active components of optical systems; and
adjusting the optical components to optimize optical signal transmission through the optical systems from the active optical components.

5. An optical system production method as claimed in claim 1, wherein the step of characterizing the positions of the optical components comprises:
energizing active components of optical systems; and
adjusting a position of at least one passive optical component in each of the optical systems to optimize optical signal transmission from the active components through the optical systems.

6. An optical system production method as claimed in claim 1, wherein the step of characterizing the positions of the optical components comprises:
energizing active components of optical systems; and
adjusting positions of at least two passive optical components in each of the optical systems to optimize optical signal transmission between the passive components.

7. An optical system production method as claimed in claim 1, wherein the pick and place machine is a flip-chip bonder.

8. An optical system production method as claimed in claim 1, wherein the step of mechanically adjusting the relative positions of the optical components comprises engaging mounting structures supporting the optical components and moving the structures relative to the optical benches with the optical system aligner.

9. An optical system production method as claimed in claim 1, wherein the step of mechanically adjusting the relative positions of the optical components comprises engaging mounting structures supporting the optical components and plastically deforming the structures relative to the optical benches with the optical system aligner.

10. An optical system production method as claimed in claim 1, further comprising attaching optical components to mounting structures supplied from an alignment structure supply.

11. An optical system production method, comprising
supplying optical benches from an optical bench supply;
supplying optical components from a component supply;
supplying mounting structures from an alignment structure supply;
attaching the optical components to the mounting structures at a pick and place machine;
receiving optical components, attached to the mounting structures, and optical benches from the optical bench supply at a pick-and-place machine;
attaching the optical components to the optical benches, via the mounting structures, with the pick-and-place machine;
characterizing positions of the optical components, which have been attached to the optical benches; and
mechanically adjusting the relative positions of the optical components with an optical system aligner by deforming the mounting structures to which the optical components are attached.

* * * * *